US006098128A

United States Patent [19]
Velez-McCaskey et al.

[11] Patent Number: 6,098,128
[45] Date of Patent: *Aug. 1, 2000

[54] UNIVERSAL STORAGE MANAGEMENT SYSTEM

[75] Inventors: Ricardo E. Velez-McCaskey, Nashua; Gustavo Barillas-Trennert, Litchfield, both of N.H.

[73] Assignee: Cyberstorage Systems Corporation, Nashua, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/714,846

[22] Filed: Sep. 17, 1996

Related U.S. Application Data

[60] Provisional application No. 60/003,920, Sep. 18, 1995.

[51] Int. Cl.[7] .................................................. G06F 13/12
[52] U.S. Cl. .............................. 710/65; 710/74; 709/203; 709/226
[58] Field of Search .................................. 395/500, 427, 395/309, 200.33

[56] References Cited

U.S. PATENT DOCUMENTS

| | | |
|---|---|---|
| 4,656,544 | 4/1987 | Yamanouchi . |
| 4,993,030 | 2/1991 | Krakauer et al. . |
| 5,210,824 | 5/1993 | Putz et al. ................................. 395/145 |
| 5,329,619 | 7/1994 | Page' et al. ............................ 395/200 |
| 5,398,253 | 3/1995 | Gordon . |
| 5,423,046 | 6/1995 | Nunnelley et al. . |
| 5,440,716 | 8/1995 | Schultz et al. . |
| 5,483,419 | 1/1996 | Kaczeus, Sr. et al. . |
| 5,495,607 | 2/1996 | Pisello et al. . |
| 5,519,844 | 5/1996 | Stallmo . |
| 5,530,845 | 6/1996 | Hiatt et al. . |
| 5,642,337 | 6/1997 | Oskay et al. ............................. 369/30 |
| 5,742,762 | 4/1998 | Scholl et al. ......................... 395/200.3 |
| 5,758,074 | 5/1998 | Marlin et al. ........................ 395/200.8 |
| 5,794,229 | 4/1993 | French et al. .............................. 707/2 |

OTHER PUBLICATIONS

Fisher, Susan E., RAID System Offers GUI, Flexible Drive Function. (Pacific Micro Data Inc's Mast VIII) (Brief Article), *PC Week*, Apr. 25, 1994 v11 n16 p 71 (1), Copyright: Ziff Davis Publishing Company 1994.

Enos, Randy, Choosing a RAID Storage Solution. (included related glossary and related article on open support) (Special Report: Fault Tolerance), *LAN Times*, Sep. 19, 1994 v11 n19 p66 (3) Copyright: McGraw Hill, Inc. 1994.

David A. Patterson, Peter Chen, Garth Gibson, and Randy H. Katz, Introduction to Redundancy Arrays of Inexpensive Disks (RAID), Computer Science Division, Department of Electrical Engineering and Computer Sciences, University of California, CH2686–4/89/0000/0112$01.00 © 1989 IEEE.

Mark B. Friedman, RAID Keeps Going and Going and . . . *IEEE Spectrum*, Apr. 1996.

*Primary Examiner*—Kevin J. Teska
*Assistant Examiner*—Kyle J. Choi
*Attorney, Agent, or Firm*—Breneman & Georges

[57] ABSTRACT

A universal storage management system which facilitates storage of data from a client computer and computer network is disclosed. The universal storage management system functions as an interface between the client computer and at least one storage device, and facilitates reading and writing of data by handling I/O operations. I/O operation overhead in the client computer is reduced by translating I/O commands from the client computer into high level commands which are employed by the storage management system to carry out I/O operations. The storage management system also enables interconnection of a normally incompatible storage device and client computer by translating I/O requests into an intermediate common format which is employed to generate commands which are compatible with the storage device receiving the request. Files, error messages and other information from the storage device are similarly translated and provided to the client computer.

32 Claims, 26 Drawing Sheets

AUTOMATIC EJECTION FLOW DIAGRAM

VERTICAL AND HORIZONTAL POWER SHARING METHOD
BOTH METHODS ARE USED

HORIZONTAL
— ON EACH RACK THE POWER SUPPLY IS IN A N+1 PROTECTED CONFIGURATION

VERTICAL (UNIQUE METHOD)
— POWER SUPPLIES ARE SHARED AND PROTECTED VERTICALLY BY ANOTHER RACK

— COULD BE CONFIGURED AS A N+1, N+1+1 OR N+R WHERE R IS THE # OF RANKS

UNIVERSAL STORAGE MANAGEMENT SYSTEM

PRIORITY

A claim of priority is made to U.S. Provisional Patent Application Ser. No. 60/003,920 entitled UNIVERSAL STORAGE MANAGEMENT SYSTEM, filed Sep. 18 1995.

FIELD OF THE INVENTION

The present invention is generally related to data storage systems, and more particularly to cross-platform data storage systems and RAID systems.

BACKGROUND OF THE INVENTION

One problem facing the computer industry is lack of standardization in file subsystems. This problem is exacerbated by I/O addressing limitations in existing operating systems and the growing number of non-standard storage devices. A computer and software application can sometimes be modified to communicate with normally incompatible storage devices. However, in most cases such communication can only be achieved in a manner which adversely affects I/O throughput, and thus compromises performance. As a result, many computers in use today are "I/O bound." More particularly, the processing capability of the computer is faster than the I/O response of the computer, and performance is thereby limited. A solution to the standardization problem would thus be of interest to both the computer industry and computer users.

In theory it would be possible to standardize operating systems, file subsystems, communications and other systems to resolve the problem. However, such a solution is hardly feasible for reasons of practicality. Computer users often exhibit strong allegiance to particular operating systems and architectures for reasons having to do with what the individual user requires from the computer and what the user is accustomed to working with. Further, those who design operating systems and associated computer and network architectures show little propensity toward cooperation and standardization with competitors. As a result, performance and ease of use suffer.

SUMMARY OF THE INVENTION

Disclosed is a universal storage management system which facilitates storage of data from a client computer. The storage management system functions as an interface between the client computer and at least one storage device and facilitates reading and writing of data by handling I/O operations. More particularly, I/O operation overhead in the client computer is reduced by translating I/O commands from the client computer to high level I/O commands which are employed by the storage management system to carry out I/O operations. The storage management system also enables interconnection of a normally incompatible storage device and client computer by translating I/O requests into an intermediate common format which is employed to generate commands which are compatible with the storage device receiving the request. Files, error messages and other information from the storage device are similarly translated and provided to the client computer.

The universal storage management system provides improved performance since client computers attached thereto are not burdened with directly controlling I/O operations. Software applications in the client computers generate I/O commands which are translated into high level commands which are sent by each client computer to the storage system, The storage management system controls I/O operations for each client computer based on the high level commands. Overall network throughput is improved since the client computers are relieved of the burden of processing slow I/O requests.

The universal storage management system can provide a variety of storage options which are normally unavailable to the client computer. The storage management system is preferably capable of controlling multiple types of storage devices such as disk drives, tape drives, CD-ROMS, magneto optical drives etc., and making those storage devices available to all of the client computers connected to the storage management system. Further, the storage management system can determine which particular storage media any given unit of data should be stored upon or retrieved from. Each client computer connected to the storage system thus gains data storage options because operating system limitations and restrictions on storage capacity are removed along with limitations associated with support of separate storage media. For example, the universal storage management system can read information from a CD-ROM and then pass that information on to a particular client computer, even though the operating system of that particular client computer has no support for or direct connection to the CD-ROM.

By providing a common interface between a plurality of client computers and a plurality of shared storage devices, network updating overhead is reduced. More particularly, the storage management system allows addition of drives to a computer network without reconfiguration of the individual client computers in the network. The storage management system thus saves installation time and removes limitations associated with various network operating systems to which the storage management system may be connected.

The universal storage management system reduces wasteful duplicative storage of data. Since the storage management system interfaces incompatible client computers and storage devices, the storage management system can share files across multiple heterogeneous platforms. Such file sharing can be employed to reduce the overall amount of data stored in a network. For example, a single copy of a given database can be shared by several incompatible computers, where multiple database copies were previously required. Thus, in addition to reducing total storage media requirements, data maintenance is facilitated.

The universal storage management system also provides improved protection of data. The storage management system isolates regular backups from user intervention, thereby addressing problems associated with forgetful or recalcitrant employees who fail to execute backups regularly.

BRIEF DESCRIPTION OF THE DRAWING

These and other features of the present invention will become apparent in light of the following detailed description thereof, in which.

DETAILED DESCRIPTION OF THE INVENTION

Figure 1:
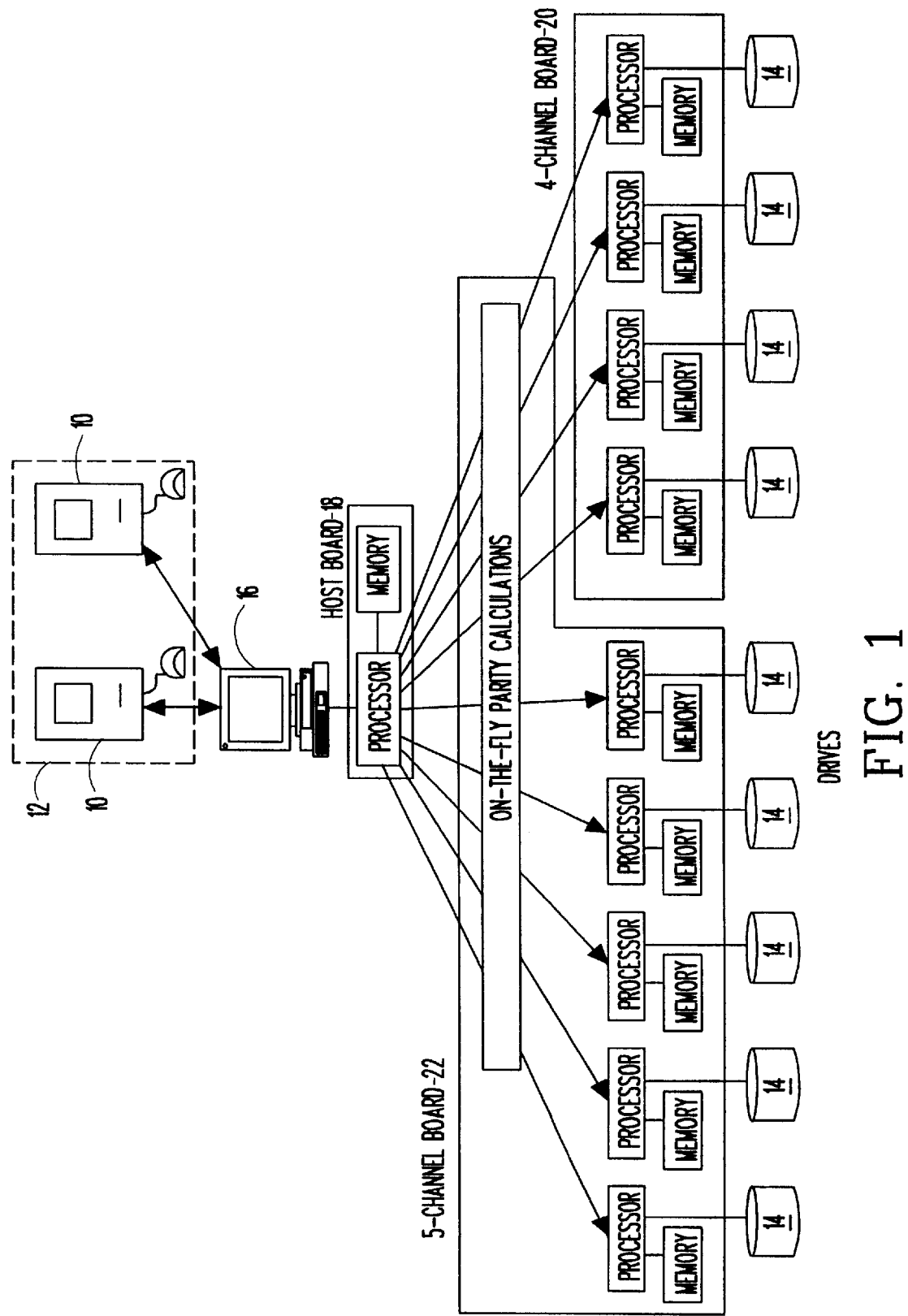
FIG. 1 is a block diagram which illustrates the storage management system in a host computer.
Figure 1A:
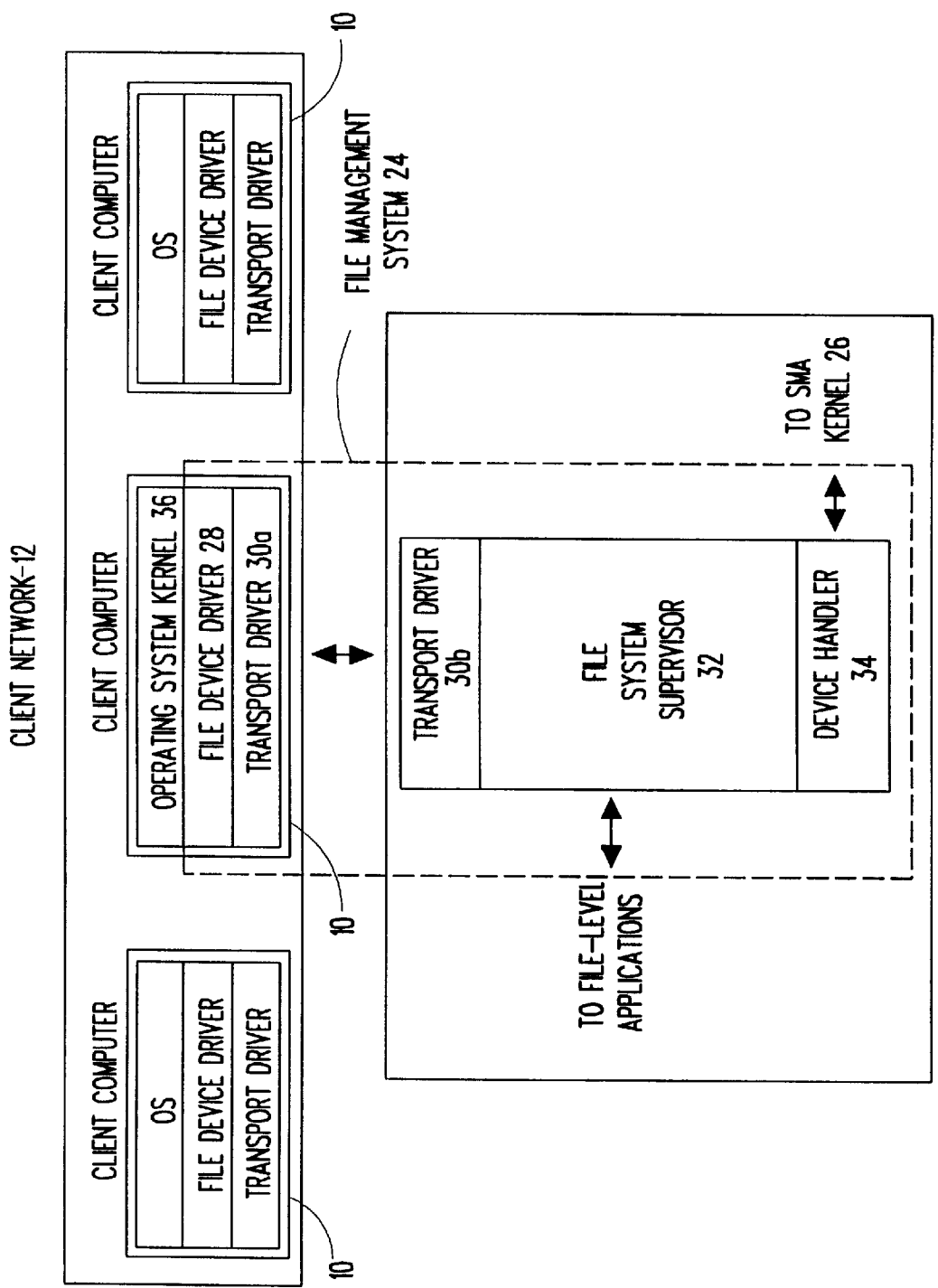
FIG. 1a is a block diagram of the file management system.

Referring to FIGS. 1 and 1a, the universal storage management system includes electronic hardware and software which together provide a cross platform interface between at least one client computer 10 in a client network 12 and at least one storage device 14. The universal storage management system is implemented in a host computer 16 and can include a host board 18, a four channel board 20, a five channel board 22 for controlling the storage devices 14. It should be noted, however, that the software could be implemented on standard hardware. The system is optimized to handle I/O requests from the client computer and provide universal storage support with any of a variety of client computers and storage devices. I/O commands from the client computer are translated into high level commands, which in turn are employed to control the storage devices.

Referring to FIGS. 1, 1a, 2 & 2a, the software portion of the universal storage management system includes a file management system 24 and a storage management architecture ("SMA") kernel 26. The file management system manages the conversion and movement of files between the client computer 10 and the SMA Kernel 26. The SMA kernel manages the flow of data and commands between the client computer, device level applications and actual physical devices.

The file management system includes four modules: a file device driver 28, a transport driver 30a, 30b, a file system supervisor 32, and a device handler 34. The file device driver provides an interface between the client operating system 36 and the transport driver. More particularly, the file device driver resides in the client computer and redirects files to the transport driver. Interfacing functions performed by the file device driver include receiving data and commands from the client operating system, converting the data and commands to a universal storage management system file format, and adding record options, such as lock, read-only and script.

The transport driver 30a, 30b facilitates transfer of files and other information between the file device driver 28 and the file system supervisor 32. The transport driver is specifically configured for the link between the client computers and the storage management system. Some possible links include: SCSI-2, SCSI-3, fiber link, 802.3, 802.5, synchronous and a synchronous RS232, wireless RF, and wireless IR. The transport driver includes two components: a first component 30a which resides in the client computer and a second component 30b which resides in the storage management system computer. The first component receives data and commands from the file device driver. The second component relays data and commands to the file system supervisor. Files, data, commands and error messages can be relayed from the file system supervisor to the client computer operating system through the transport driver and file device driver.

The file system supervisor 32 operates to determine appropriate file-level applications for receipt of the files received from the client computer 10. The file system supervisor implements file specific routines on a common format file system. Calls made to the file system supervisor are high level, such as Open, Close, Read, Write, Lock, and Copy. The file system supervisor also determines where files should be stored, including determining on what type of storage media the files should be stored. The file system supervisor also breaks each file down into blocks and then passes those blocks to the device handler. Similarly, the file system supervisor can receive data from the device handler.

The device handler 34 provides an interface between the file system supervisor 32 and the SMA kernel 26 to provide storage device selection for each operation. A plurality of device handlers are employed to accommodate a plurality of storage devices. More particularly, each device handler is a driver which is used by the file system supervisor to control a particular storage device, and allow the file system supervisor to select the type of storage device to be used for a specific operation. The device handlers reside between the file system supervisor and the SMA kernel and the storage devices. The device handler thus isolates the file system supervisor from the storage devices such that the file system supervisor configuration is not dependent upon the configuration of the specific storage devices employed in the system.

The SMA Kernel 26 includes three independent modules: a front end interface 36, a scheduler 38, and a back-end interface 40. The front end interface is in communication with the client network and the scheduler. The scheduler is in communication with the back-end interface, device level applications, redundant array of independent disks ("RAID") applications and the file management system. The back-end interface is in communication with various storage devices.

The front-end interface 36 handles communication between the client network 12 and resource scheduler 38, running on a storage management system based host controller which is connected to the client network and interfaced to the resource scheduler. A plurality of scripts are loaded at start up for on-demand execution of communication tasks. More particularly, if the client computer and storage management system both utilize the same operating system, the SMA kernel can be utilized to execute I/O commands from software applications in the client computer without first translating the I/O commands to high level commands as is done in the file management system.

The resource scheduler 38 supervises the flow of data through the universal storage management system. More particularly, the resource scheduler determines whether individual data units can be passed directly to the back-end interface 40 or whether the data unit must first be processed by one of the device level applications 42 or RAID applications 44. Block level data units are passed to the resource scheduler from either the front-end interface or the file management system.

The back-end interface 40 manages the storage devices 14. The storage devices are connected to the back-end interface by one or more SCSI type controllers through which the storage devices are connected to the storage management system computer. In order to control non-standard SCSI devices, the back-end interface includes pre-loaded scripts and may also include device specific drivers.

Figure 2:
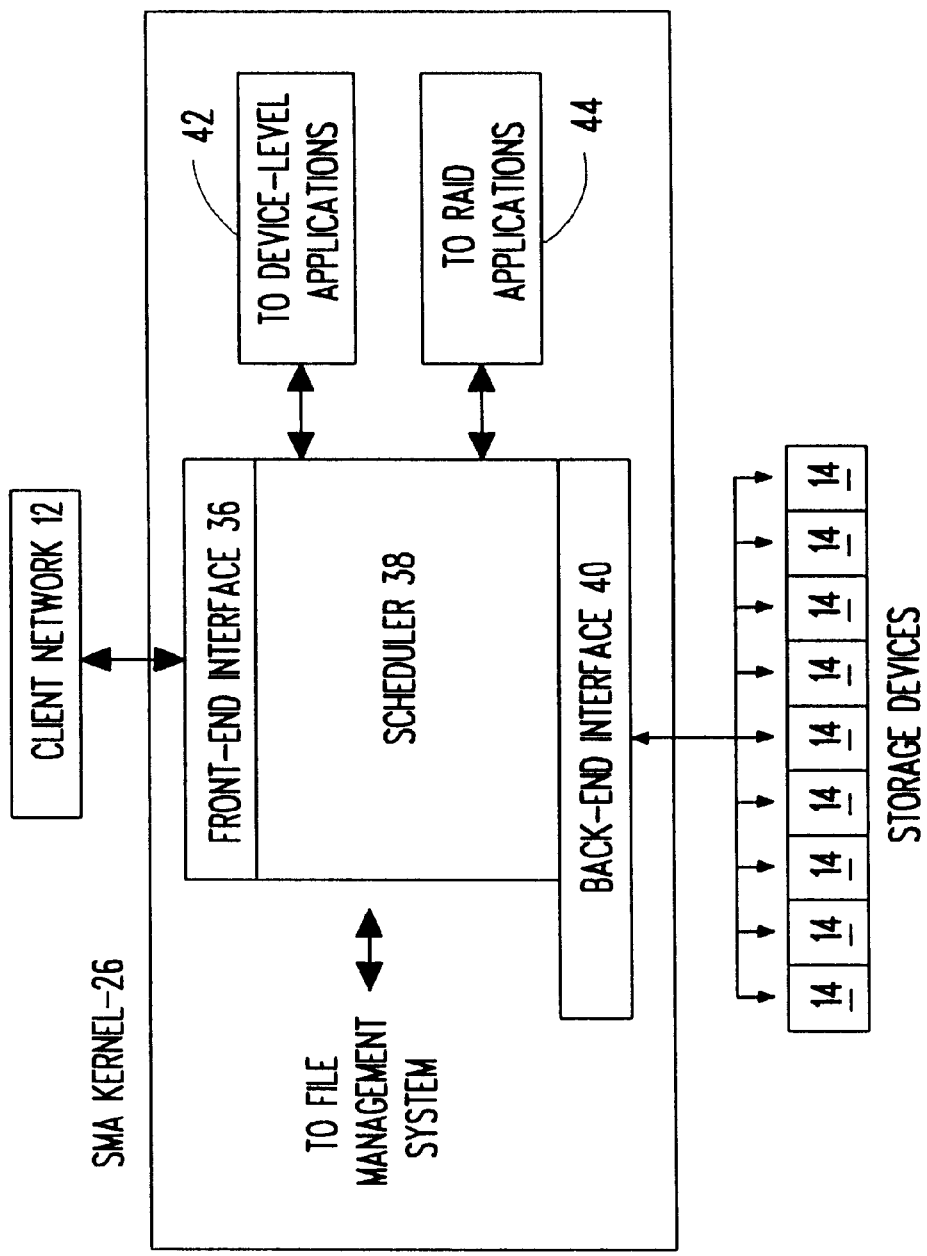
FIG. 2 is a block diagram of the SMA kernel.
Figure 2A:
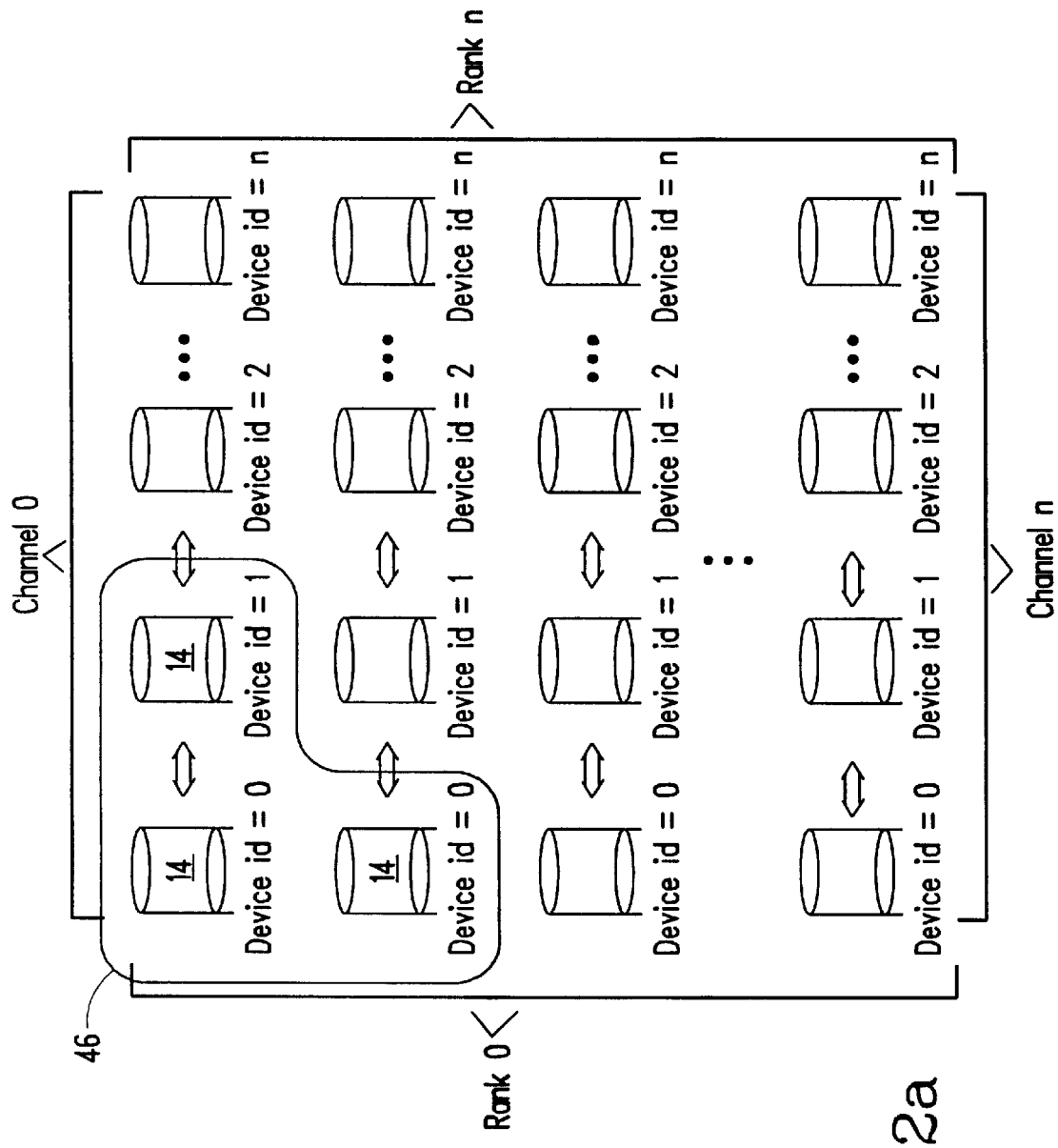
FIG. 2a illustrates the storage devices of FIG. 2.

FIG. 2a illustrates the storage devices 14 of FIG. 2. The storage devices are identified by rank (illustrated as columns), channel (illustrated as rows) and device ID. A rank is a set of devices with a common ID, but sitting on different channels. The number of the rank is designated by the common device ID. For example, rank 0 includes the set of all devices with device ID=0. The storage devices may be addressed by the system individually or in groups called arrays 46. An array associates two or more storage devices 14 (either physical devices or logical devices) into a RAID level. A volume is a logical entity for the host such as a disk or tape or array which has been given a logical SCSI ID. There are four types of volumes including a partition of an array, an entire array, a span across arrays, and referring to a single device.

The storage management system employs high level commands to access the storage devices. The high level commands include array commands and volume commands, as follows:

Array Commands

"acreate"

The acreate command creates a new array by associating a group of storage devices in the same rank and assigning them a RAID level.

Syntax:
  acreate (in rank_id, int level, char *aname, int ch_use);

| rank_id | Id of rank on which the array will be created. |
|---|---|
| level | RAID level to use for the array being created |
| aname | Unique name to be given to array. if NULL, one will be assigned by the system. |
| ch_use | bitmap indicating which channels to use in this set of drives. |
| Return | 0 |
| ERANK | Given rank does not exist or it is not available to create more arrays. |
| ELEVEL | Illegal RAID level |
| ECHANNEL | No drives exist in given bitmap or drives are already in use by another array. |

"aremove"

The aremove command removes the definition of a given array name and makes the associated storage devices available for the creation of other arrays.

Syntax:
  aremove (char *aname);

aname name of the array to remove

Volume Commands

"vopen"

The vopen command creates and/or opens a volume, and brings the specified volume on-line and readies that volume for reading and/or writing.

Syntax:
  vopen (char *arrayname, char *volname, VOLHANDLE *vh,int flags);

| arrayname | Name of the array on which to create/open the volume. |
|---|---|
| volname | Name of an existing volume or the name to be given to the volume to create. If left NULL, and the O_CREAT flag is given, one will be assigned by the system and this argument will contain the new name. |
| vh | When creating a volume, this contains a pointer to parameters to be used in the creation of requested volume name. If opening an existing volume, these parameters will be returned by the system. |
| flags | A constant with one or more of the following values. |
| O_CREAT | The system will attempt create the volume using the parameters give in vh. If the volume already exists, this flag will be ignored. |
| O_DENYRD | Denies reading privileges to any other tasks on this volume anytime after this call is made. |
| O_DENYWR | Deny writing privileges to any other tasks that open this volume anytime after this call is made. |
| O_EXCLUSIVE | Deny any access to this volume anytime after this call is made. |
| Return 0 | Successful open/creation of volume |
| EARRAY | Given array does not exist |
| EFULL | Given array is full |

"vclose"

The vclose command closes a volume, brings the specified volume off-line, and removes all access restrictions imposed on the volume by the task that opened it.

Syntax:
  vclose (VOLHANDLE *vh);

| vh | Volume handle, returned by the system when the volume was opened/created |
|---|---|

"vread"

The vread command reads a specified number of blocks into a given buffer from an open volume given by "vh".

Syntax:
  vread (VOLHANDLE *vh, char *bufptr, BLK_ADDR lba, INT count);

| vh | Handle of the volume to read from |
|---|---|
| bufptr | Pointer to the address in memory where the data is to be read into |
| lba | Logical block address to read from |
| count | Number of blocks to read from given volume |
| Return 0 | Successful read |
| EACCESS | Insufficient rights to read from this volume |
| EHANDLE | Invalid volume handle |
| EADDR | Illegal logical block address |

"vwrite"

The vwrite command writes a specified number of blocks from the given buffer to an open volume given by "vh."

Syntax:
    vwrite (VOLHANDLE *vh, char *bufptr, BLK_
       ADDR lba, INT count);

| | |
|---|---|
| vh | Handle of the volume to write to |
| bufptr | Pointer to the address in memory where the data to be written to the device resides |
| lba | Volume Logical block address to write to |
| count | Number of blocks to write to given volume |
| Return | 0    Successful read |
| EACCESS | Insufficient rights to write to this volume |
| EHANDLE | Invalid volume handle |
| EADDR | Illegal logical block address |

"volcpy"

The volcpy command copies "count" number of blocks from the location given by src_addr in src_vol to the logical block address given by dest_addr in dest_vol. Significantly, the command is executed without interaction with the client computer.

Syntax:
    volcpy (VOLHANDLE *dest_vol, BLK_ADDR
       dest_lba, VOLHANDLE *src_vol, BLK_ADDR
       src_lba, ULONG count);

| | |
|---|---|
| dest_vol | handle of the volume to be written to |
| dest_lba | destination logical block address |
| src_vol | handle of the volume to be read from |
| src_lba | Source logical block address |
| count | Number of blocks to write to given volume |
| Return | 0           Successful read |
| EACCW | Insufficient rights to write to this destination volume |
| EACCR | Insufficient rights to read from source volume |
| EDESTH | Invalid destination volume handle |
| ESRCH | Invalid source volume handle |
| EDESTA | Illegal logical block address for destination volume |
| ESRCA | Illegal logical block address for source volume |

The modular design of the storage management system software provides some advantages. The SMA Kernel and file management system are independent program groups which do not have interdependency limitations. However, both program groups share a common application programming interface (API). Further, each internal software module (transport driver, file system supervisor, device handler, front-end interface, back-end interface and scheduler) interacts through a common protocol. Development of new modules or changes to an existing module thus do not require changes to other SMA modules, provided compliance with the protocol is maintained. Additionally, software applications in the client computer are isolated from the storage devices and their associated limitations. As such, the complexity of application development and integration is reduced, and reduced complexity allows faster development cycles. The architecture also offers high maintainability, which translates into simpler testing and quality assurance processes and the ability to implement projects in parallel results in a faster time to market.

Figure 3:
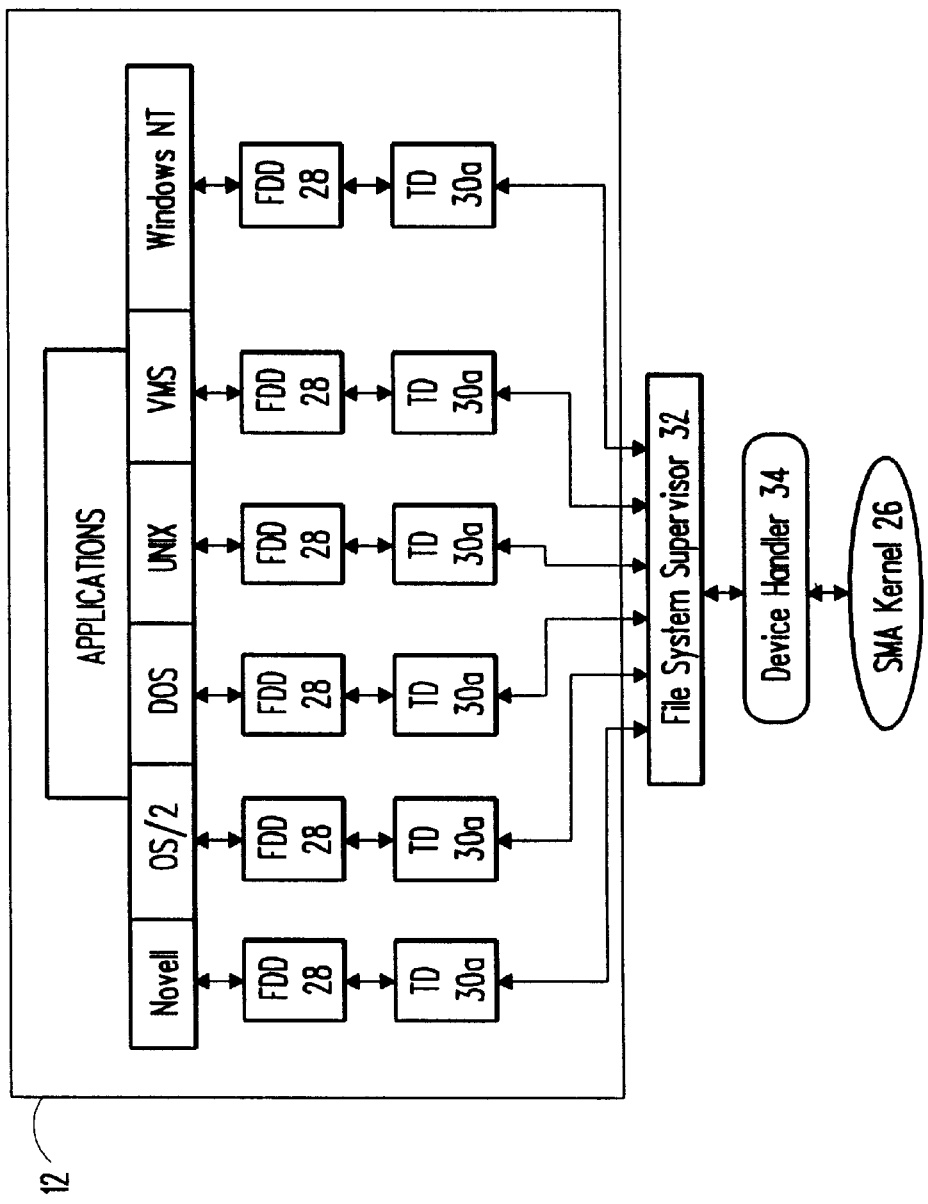
FIGS. 3 and 4 are block diagrams of an example cross-platform network employing the universal storage management system.
Figure 4:
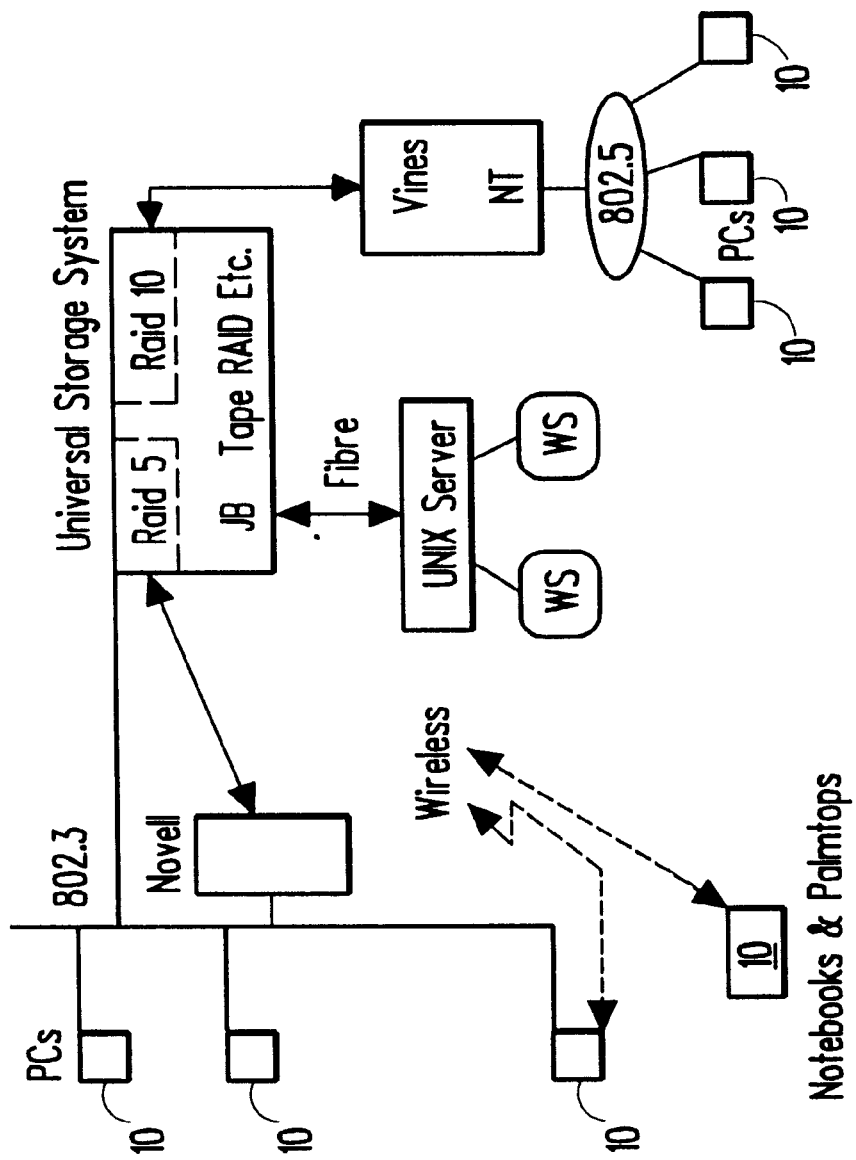

FIGS. 3 & 4 illustrate a cross platform client network employing the universal storage management system. A plurality of client computers which reside in different networks are part of the overall architecture. Individual client computers 10 and client networks within the cross platform network utilize different operating systems. The illustrated architecture includes a first group of client computers on a first network operating under a Novell based operating system, a second group of client computers on a second network operating under OS/2, a third group of client computers on a third network operating under DOS, a fourth group of client computers on a fourth network operating under UNIX, a fifth group of client computers on a fifth network operating under VMS and a sixth group of client computers on a sixth network operating under Windows-NT. The file management system includes at least one dedicated file device driver and transport driver for each operating system with which the storage management system will interact. More particularly, each file device driver is specific to the operating system with which it is used. Similarly, each transport driver is connection specific. Possible connections include SCSI-2, SCSI-3, fiber link, 802.3, 802.5, synchronous and a synchronous RS232, wireless RF, and wireless IR.

The universal storage management system utilizes a standard file format which is selected based upon the cross platform client network for ease of file management system implementation. The file format may be based on UNIX, Microsoft-NT or other file formats. In order to facilitate operation and enhance performance, the storage management system may utilize the same file format and operating system utilized by the majority of client computers connected thereto, however this is not required. Regardless of the file format selected, the file management system includes at least one file device driver, at least one transport driver, a file system supervisor and a device handler to translate I/O commands from the client computer.

Figure 5:
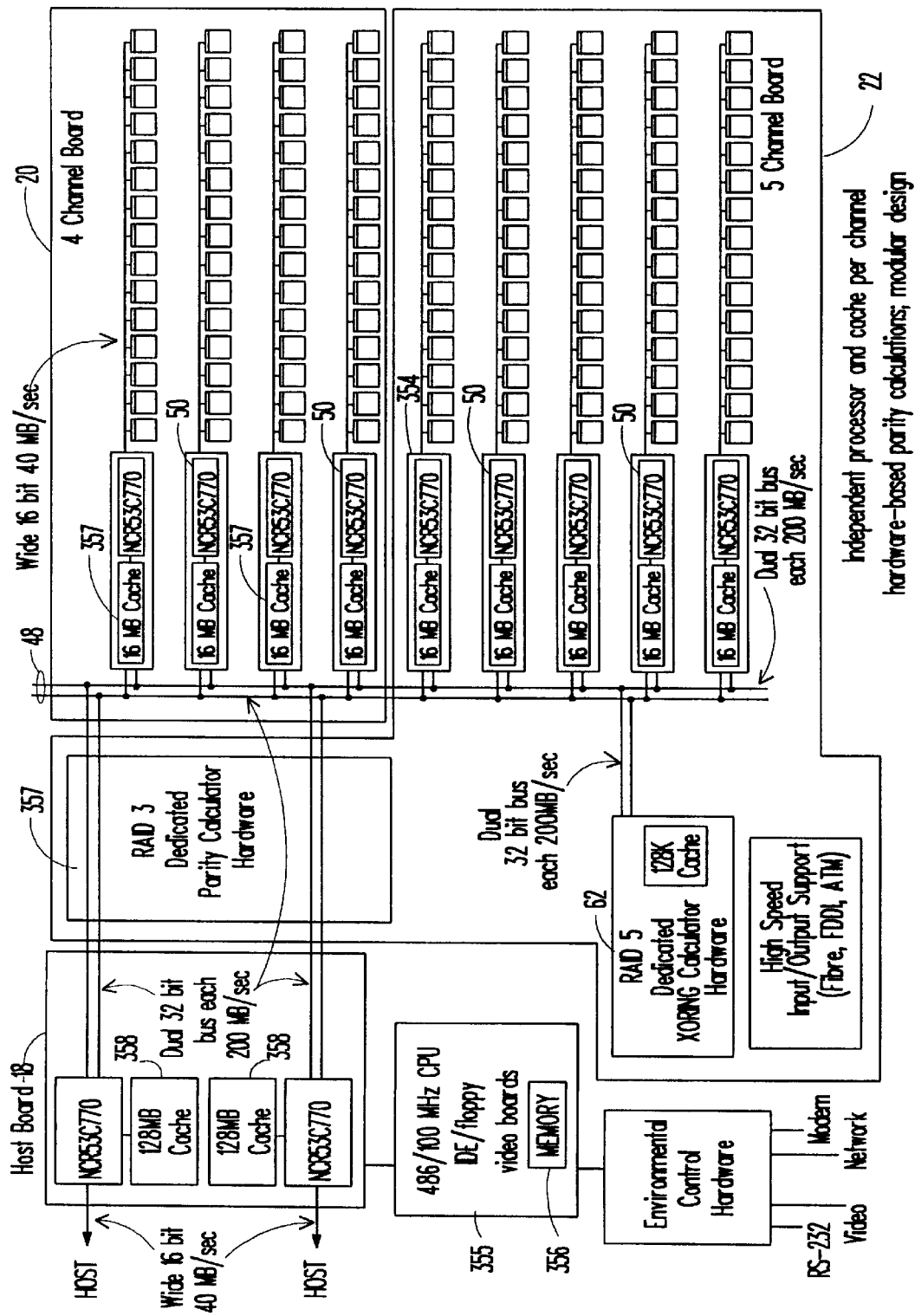
FIG. 5 is a block diagram of a RAID board for storage of data in connection with the universal storage management system.
Figure 6:
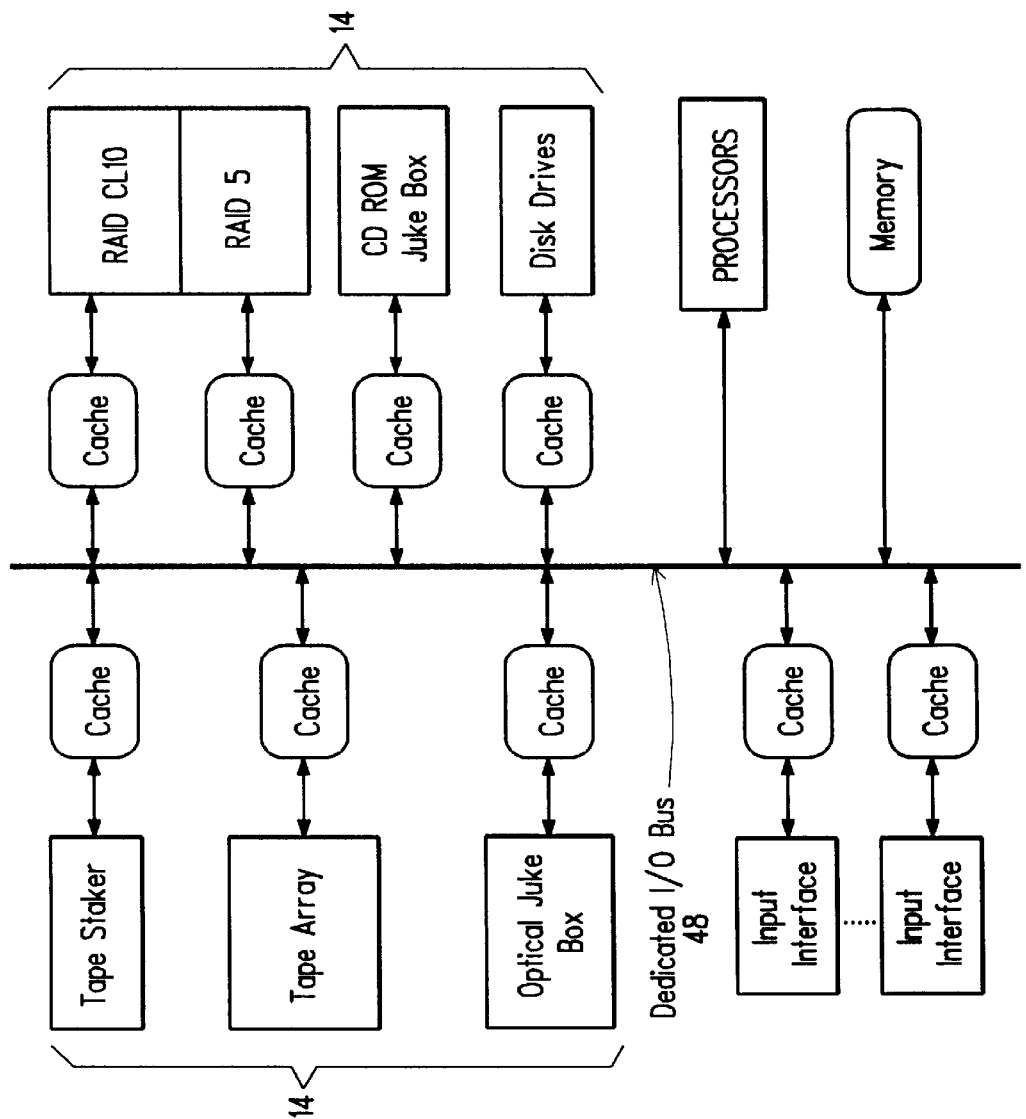
FIG. 6 is a block diagram of the universal storage management system which illustrates storage options.
Figure 10A:
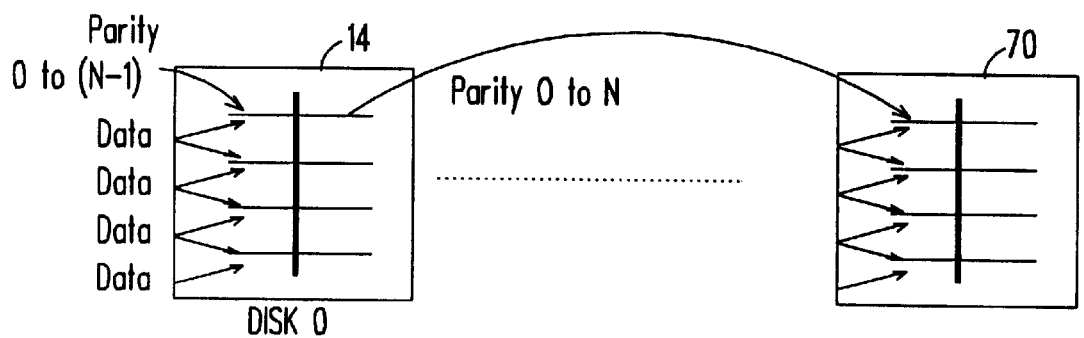
Figure 10B:
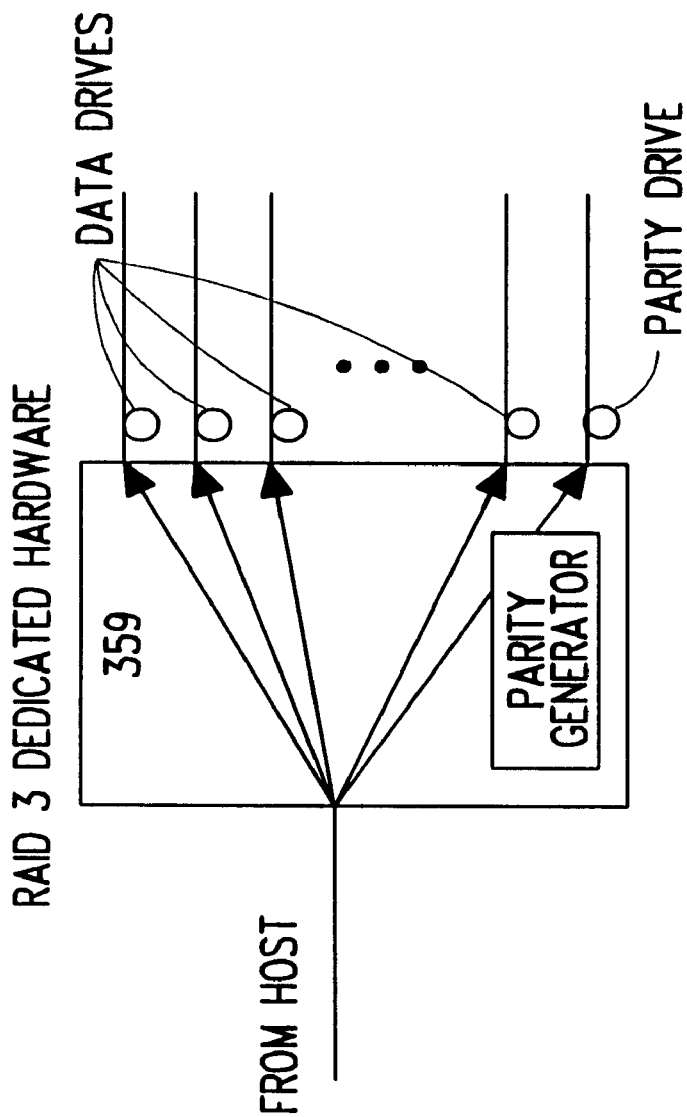

Referring to FIGS. 5, 6 and 10b, the storage management system is preferably capable of simultaneously servicing multiple client computer I/O requests at a performance level which is equal to or better than that of individual local drives. In order to provide prompt execution of I/O operations for a group of client computers the universal storage management system computer employs a powerful microprocessor or multiple microprocessors 355 capable of handling associated overhead for the file system supervisor, device handler, and I/O cache. Available memory 356 is relatively large in order to accommodate the multi-tasking storage management system operating system running multiple device utilities such as backups and juke box handlers. A significant architectural advance of the RAID is the use of multiple SCSI processors with dedicated memory pools 357. Each processor 350 can READ or WRITE devices totally in parallel. This provides the RAID implementation with true parallel architecture. Front end memory 358 could also be used as a first level of I/O caching for the different client I/O's. A double 32 bit wide dedicated I/O bus 48 is employed for I/O operations between the storage management system and the storage device modules 354. The I/O bus is capable of transmission at 200 MB/sec, and independent 32 bit wide caches are dedicated to each I/O interface.

Figure 7:
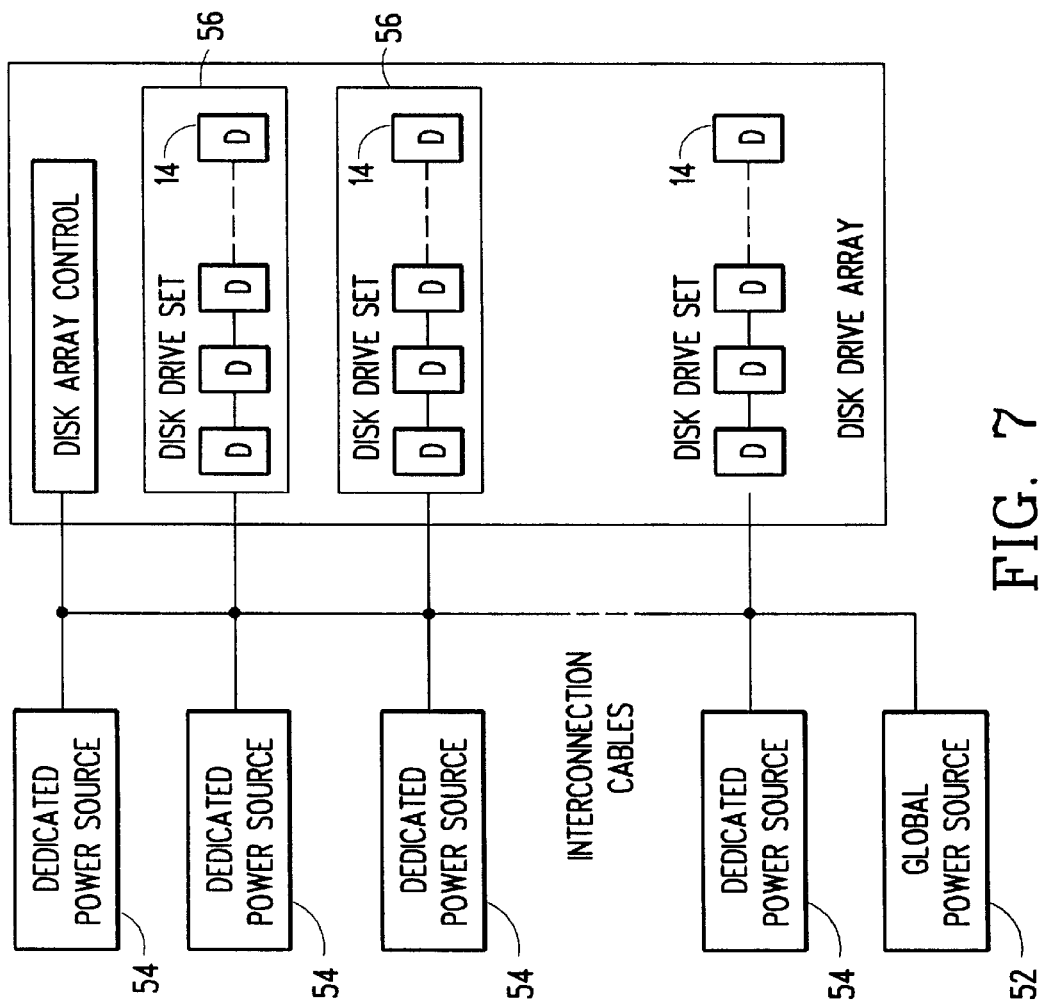
FIG. 7 is a block diagram of the redundant storage device power supply.
Figure 21:
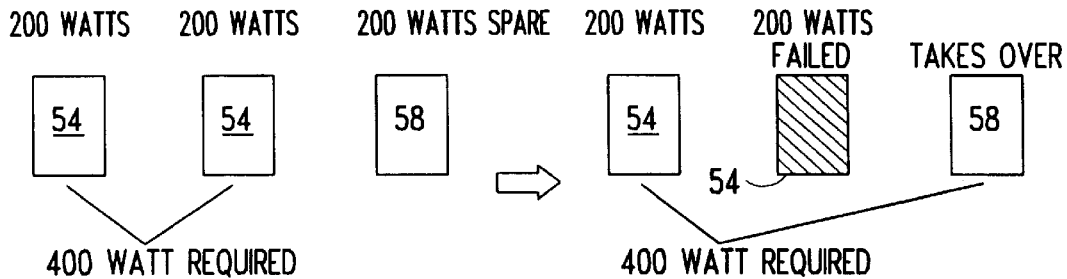
FIG. 21 is a block diagram which illustrates horizontal power sharing for handling power failures.
Figure 22:
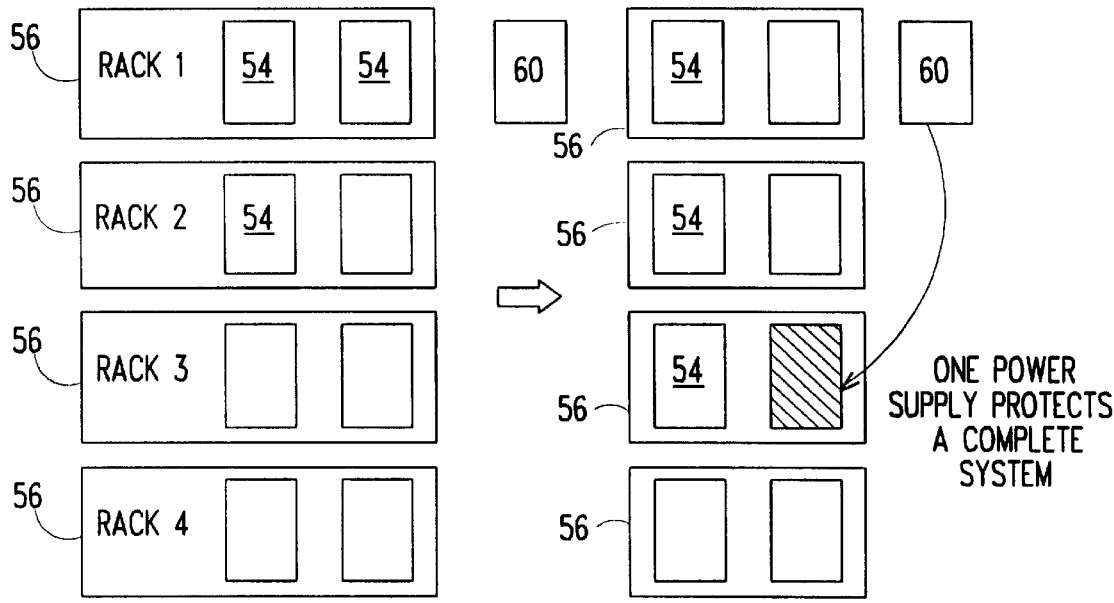
FIG. 22 is a block diagram which illustrates vertical power sharing for handling power failures.

Referring to FIGS. 7, 21 and 22, a redundant power supply array is employed to maintain power to the storage devices when a power supply fails. The distributed redundant low voltage power supply array includes a global power supply 52 and a plurality of local power supplies 54 interconnected with power cables throughout a disk array chassis. Each local power supply provides sufficient power for a rack 56 of storage devices 14. In the event of a failure of a local power supply 54, the global power supply 52 provides power to the storage devices associated with the failed local power supply. In order to provide sufficient power, the global power supply therefore should have a power capacity rating at least equal to the largest capacity local power supply.

Preferably both horizontal and vertical power sharing are employed. In horizontal power sharing the power supplies 54 for each rack of storage devices includes one redundant power supply 58 which is utilized when a local power supply 54 in the associated rack fails. In vertical power sharing a redundant power supply 60 is shared between a plurality of racks 56 of local storage devices 54.

Figure 8:
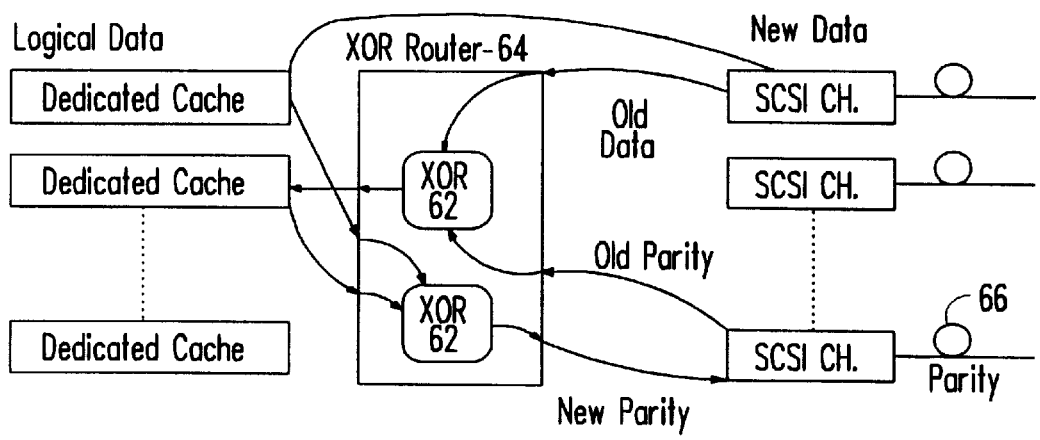
FIGS. 8–11 are block diagrams which illustrate XOR and parity computing processes.
Figure 9:
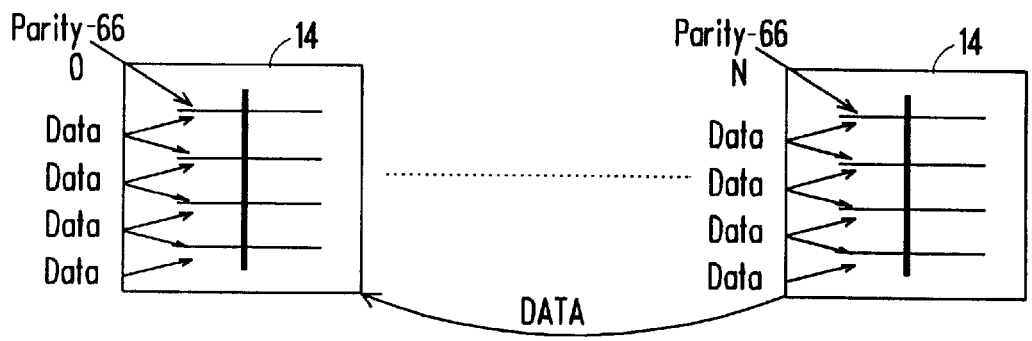

Referring now to FIGS. 8 and 9, a redundant array of independent disks ("RAID") is provided as a storage option. For implementation of the RAID, the storage management system has multiple SCSI-2 and SCSI-3 channels having from 2 to 11 independent channels capable of handling up to 1080 storage devices. The RAID reduces the write overhead penalty of known RAIDS which require execution of Read-modify-Write commands from the data and parity drives when a write is issued to the RAID. The parity calculation procedure is an XOR operation between old parity data and the old logical data. The resulting data is then XORed with the new logical data. The XOR operations are done by dedicated XOR hardware 62 in an XOR router 64 to provide faster write cycles. This hardware is dedicated for RAID-4 or RAID-5 implementations. Further, for RAID-3 implementation, parity generation and data striping have been implemented by hardware 359. As such, there is no time overhead cost for this parity calculation which is done "on the fly," and the RAID-3 implementation is as fast as a RAID-0 implementation.

Figure 11:
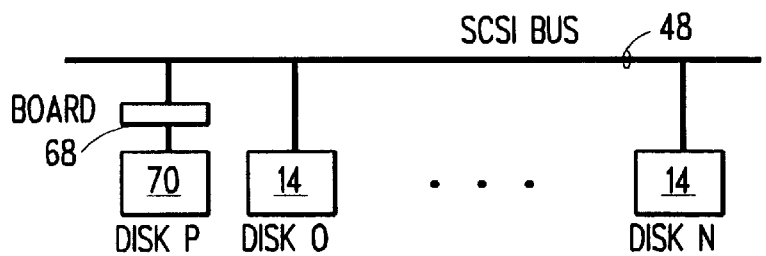

Referring now to FIGS. 9–11, at least one surface 66 of each of the drives is dedicated for parity. As such, a RAID-3 may be implemented in every individual disk of the array with the data from all other drives (See FIG. 9 specifically). The parity information may be sent to any other parity drive surface (See FIG. 10 specifically). In essence, RAID-3 is implemented within each drive of the array, and the generated parity is transmitted to the appointed parity drive for RAID-4 implementation, or striped across all of the drives for RAID-5 implementation. The result is a combination of RAID-3 and RAID-4 or RAID-5, but without the write overhead penalties. Alternatively, if there is no internal control over disk drives, as shown in FIG. 11, using standard double ported disk drives, the assigned parity drive 70 has a dedicated controller board 68 associated therewith for accessing other drives in the RAID via the dedicated bus 48, to calculate the new parity data without the intervention of the storage management system computer microprocessor.

Figure 12A:
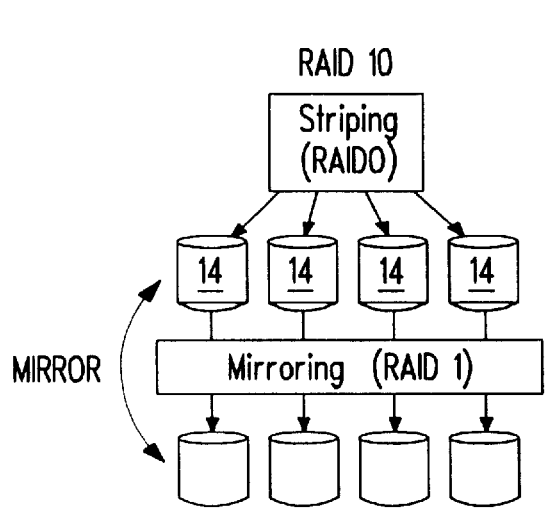
FIGS. 12a–13 are block diagrams illustrating RAID configurations for improved efficiency.
Figure 12B:
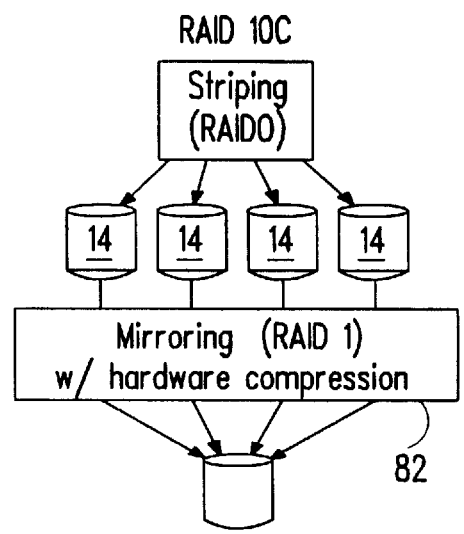
Figure 13:
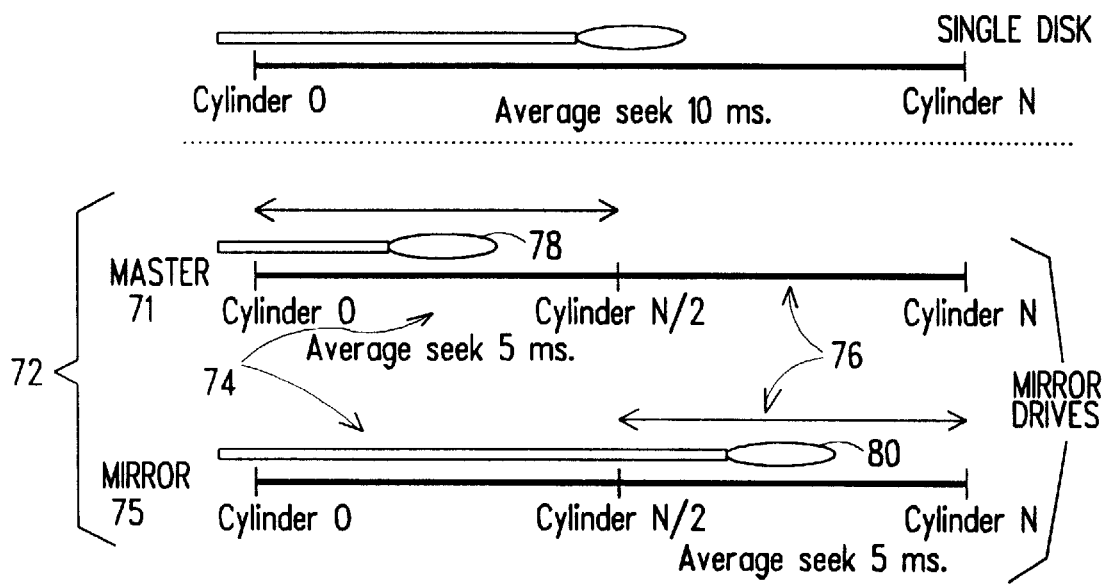

Referring to FIGS. 12a, 12b and 13, the storage management system optimizes disk mirroring for RAID-1 implementation. Standard RAID-1 implementations execute duplicate WRITE commands for each of two drives simultaneously. To obtain improved performance the present RAID divides a logical disk 72, such as a logical disk containing a master disk 71 and a mirror disk 75, into two halves 74, 76. This is possible because the majority of the operations in a standard system are Read operations, and since the information is contained in both drives. The respective drive heads 78, 80 of the master and mirror disks are then positioned at a halfway point in the first half 74 and second half 76, respectively. If the Read request goes to the first half 74 of the logical drive 72, then this command is serviced by the master disk 71. If the Read goes to the second half 76 of the logical drive 72, then it is serviced by the mirror disk 75. Since each drive head only travels one half of the total possible distance, average seek time is reduced by a factor of two. Additionally, the number of storage devices required for mirroring can be reduced by compressing 82 mirrored data and thereby decreasing the requisite number of mirror disks. By compressing the mirrored data "on the fly" overall performance is maintained.

File storage routines may be implemented to automatically select the type of media upon which to store data. Decision criteria for determining which type of media to store a file into can be determined from a data file with predetermined attributes. Thus, the file device driver can direct data to particular media in an intelligent manner. To further automate data storage, the storage management system includes routines for automatically selecting an appropriate RAID level for storage of each file. When the storage management system is used in conjunction with a computer network it is envisioned that a plurality of RAID storage options of different RAID levels will be provided. In order to provide efficient and reliable storage, software routines are employed to automatically select the appropriate RAID level for storage of each file based on file size. For example, in a system with RAID levels 3 and 5, large files might be assigned to RAID-3, while small files would be assigned to RAID-5. Alternatively, the RAID level may be determined based on block size, as predefined by the user.

Figure 14:
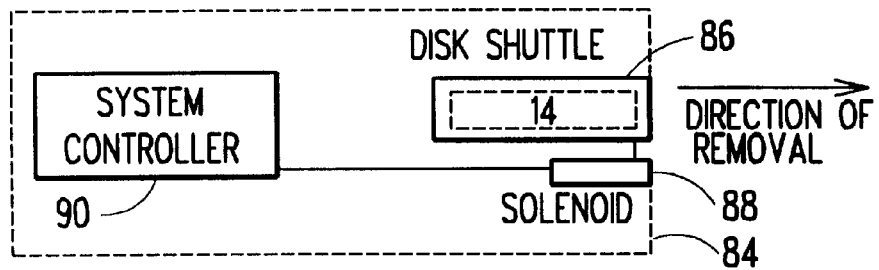
FIG. 14 is a block diagram of the automatic failed disk ejection system.
Figure 15:
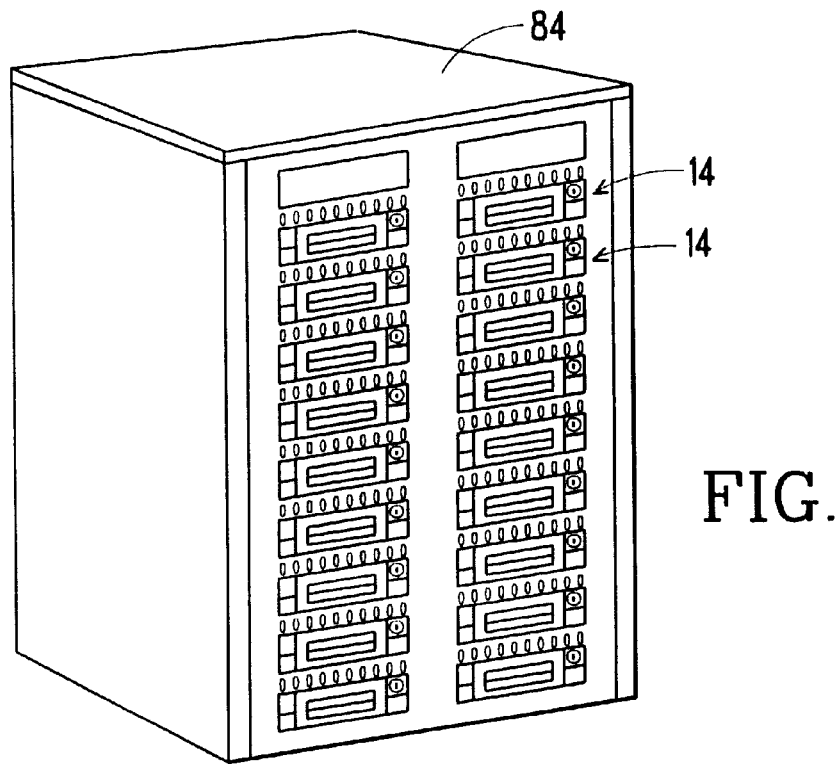
FIGS. 15 and 15a are perspective views of the storage device chassis.

Referring now to FIGS. 14 and 15, the RAID disks 14 are arrayed in a protective chassis 84. The chassis includes the global and local power supplies, and includes an automatic disk eject feature which facilitates identification and replacement of failed disks. Each disk 14 is disposed in a disk shuttle 86 which partially ejects from the chassis in response to a solenoid 88. A system controller 90 controls securing and releasing of the disk drive mounting shuttle 86 by actuating the solenoid 88. When the storage system detects a failed disk in the array, or when a user requests release of a disk, the system controller actuates the solenoid associated with the location of that disk and releases the disk for ejection.

Figure 20:
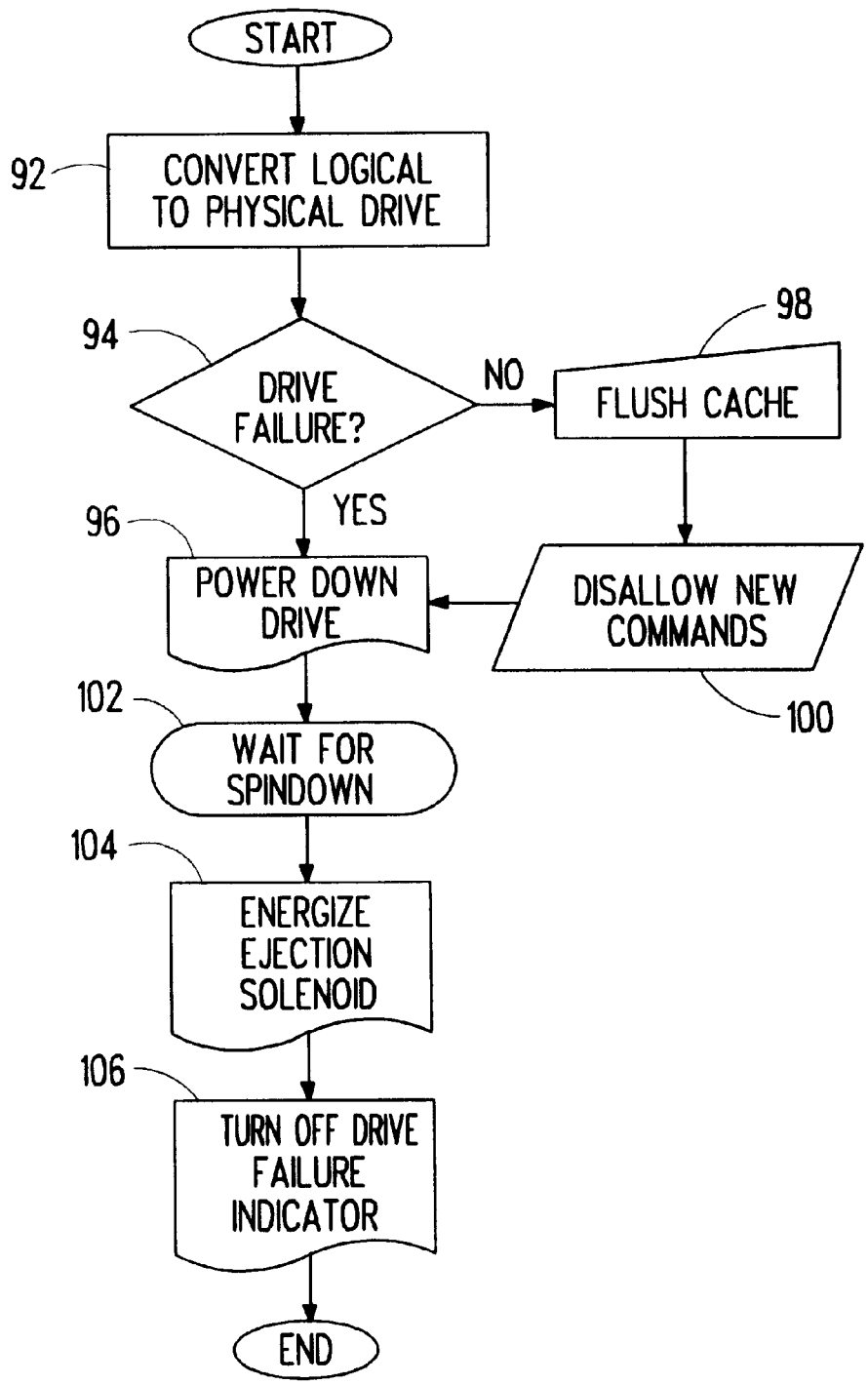
FIG. 20 is an automatic storage device ejection flow diagram.

An automatic storage device ejection method is illustrated in FIG. 20. In an initial step 92 a logical drive to physical drive conversion is made to isolate and identify the physical drive being worked upon. Then, if a drive failure is detected in step 94, the drive is powered down 96. If a drive failure is not detected, the cache is flushed 98 and new commands are disallowed 100 prior to powering the drive down 96. After powering down the drive, a delay 102 is imposed to wait for drive spin-down and the storage device ejection solenoid is energized 104 and the drive failure indicator is turned off 106.

Figure 16:
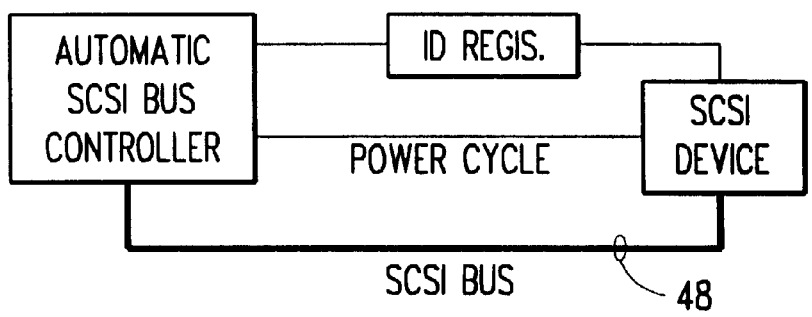
FIG. 16 is a block diagram which illustrates loading of a new SCSI ID in a disk.
Figure 17:
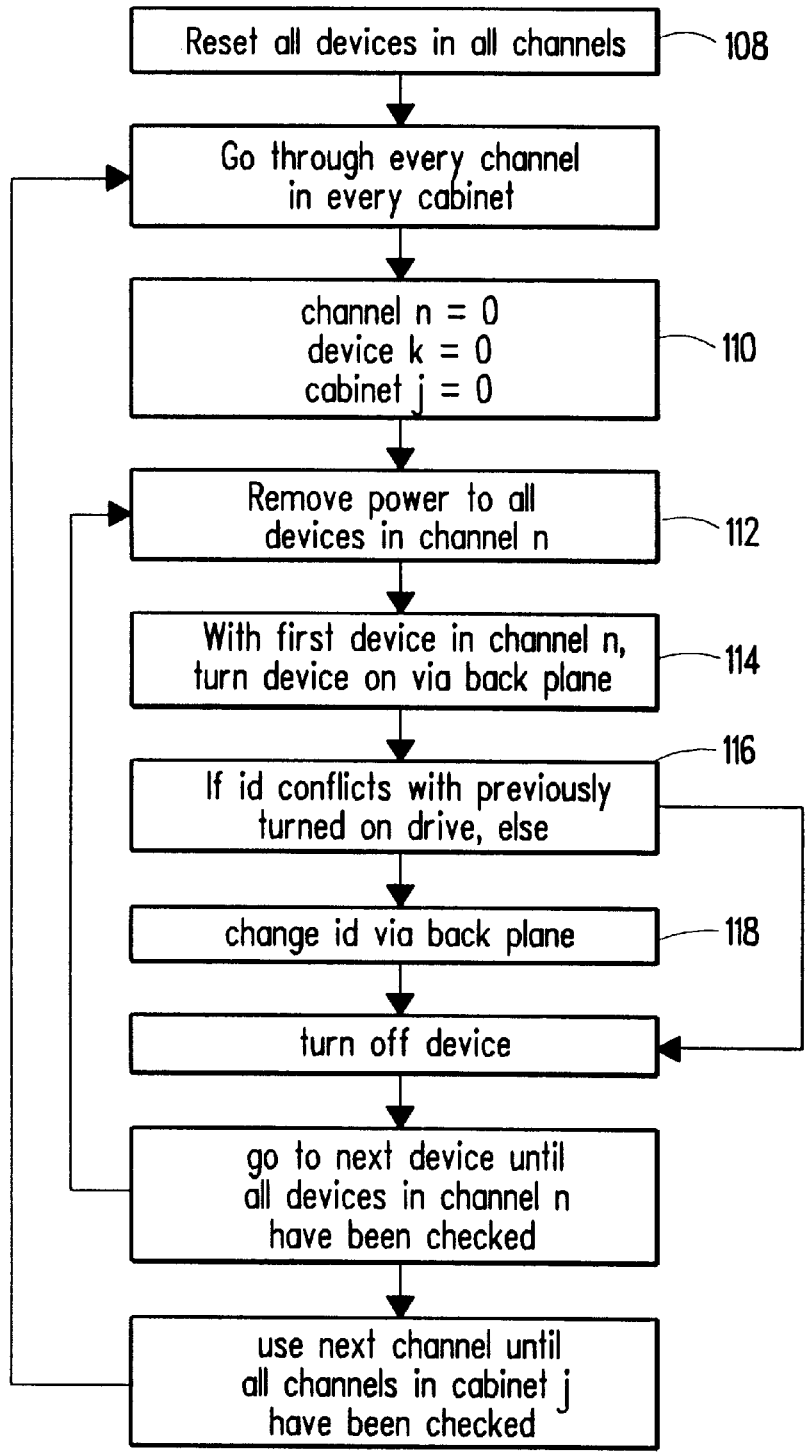
FIG. 17 is a flow diagram which illustrates the automatic initial configuration routine.

Referring to FIGS. 16 & 17, an automatic configuration routine can be executed by the backplane with the dedicated microprocessor thereon for facilitating configuring and replacement of failed storage devices. The backplane microprocessor allows control over power supplied to individual storage devices 14 within the pool of storage devices. Such individual control allows automated updating of the storage device IDs. When a storage device fails, it is typically removed and a replacement storage device is inserted in place of the failed storage device. The drive will be automatically set to the ID of the failed drive, as this information is saved in SRAM on the backplane when the automatic configuration routine was executed at system initialization (FIG. 17). When initializing the system for the first time, any device could be in conflict with another storage device in the storage device pool, the system will not be able to properly address the storage devices. Therefore, when a new system is initialized the automatic configuration routine is executed, to assure that the device Ids are not in conflict. As part of the automatic ID configuration routine all devices are reset 108, storage device identifying variables are set 110, and each of the storage devices 14 in the pool is powered down 112. Each individual storage device is then powered up 114 to determine if that device has the proper device ID 116. If the storage device has the proper ID, then the device is powered down and the next storage device is tested. If the device does not have the proper ID, then the device ID is reset 118 and the storage device is powercycled. The pseudocode for the automatic ID configuration routine includes the following steps:

| | |
|---|---|
| 1. | Reset all disks in all channels |
| 2. | Go through every channel in every cabinet: |
| 3. | channel n = 0 |
| |     cabinet j = 0 |
| |     drive k = 0 |
| 4. | Remove power to all disks in channel n |
| 5. | With first disk in channel n |
|   a. | turn drive on via back plane |
|   b. | if its id conflicts with previously turned on drive, change its id via back plane then turn drive off |
|   c. | turn drive off |
|   d. | goto next drive until all drives in channel n have been checked. |
| | Use next channel until all channels in cabinet j have been checked. |

Figure 15A:
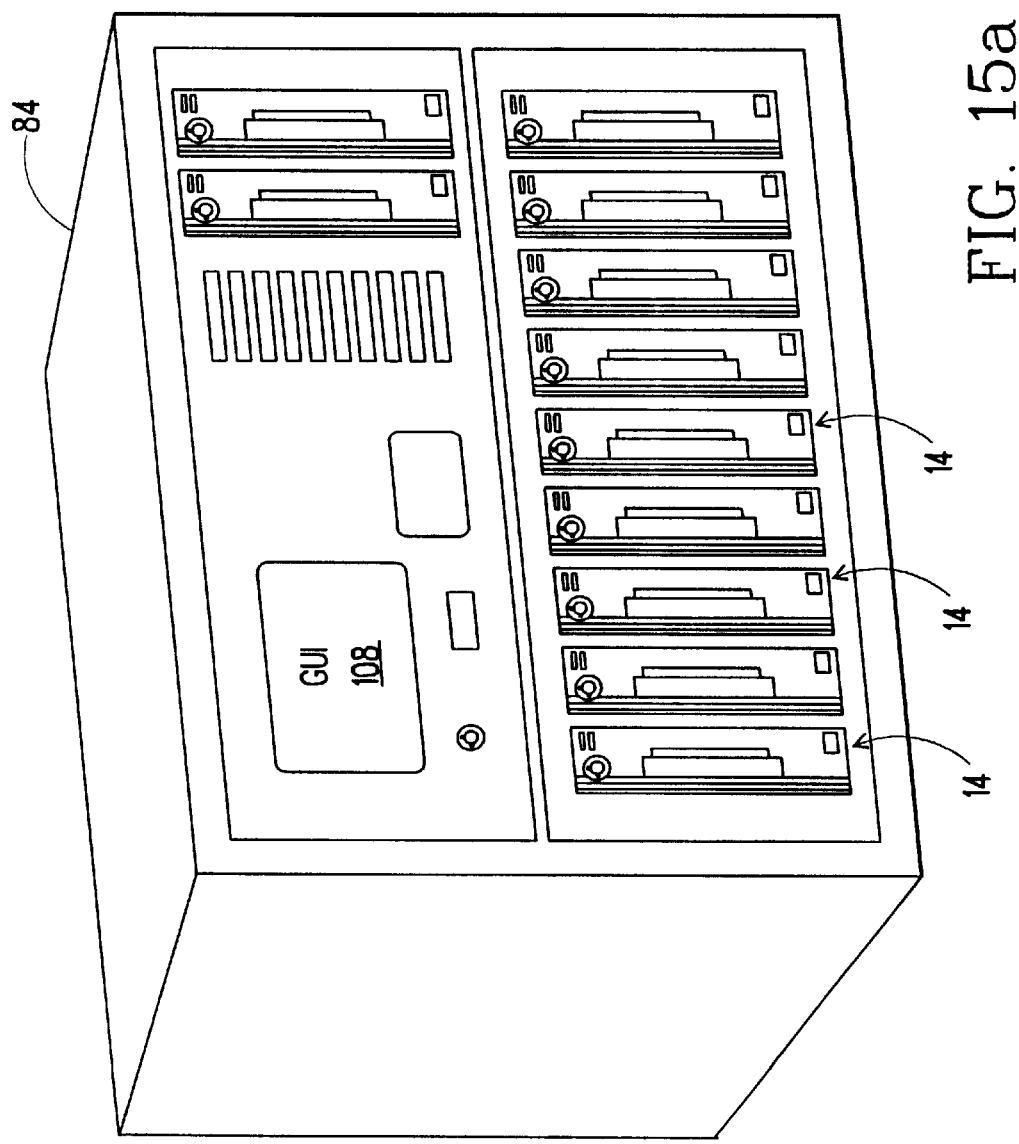

Automatic media selection is employed to facilitate defining volumes and arrays for use in the system. As a practical matter, it is preferable for a single volume or array to be made up of a single type of storage media. However, it is also preferable that the user not be required to memorize the location and type of each storage device in the pool, i.e., where each device is. The automatic media selection feature provides a record of each storage device in the pool, and when a volume or array is defined, the location of different types of storage devices are brought to the attention of the user. This and other features are preferably implemented with a graphic user interface ("GUI") 108 (FIG. 15a) which is driven by the storage management system and displayed on a screen mounted in the chassis.

Further media selection routines may be employed to provide reduced data access time. Users generally prefer to employ storage media with a fast access time for storage of files which are being created or edited. For example, it is much faster to work from a hard disk than from a CD-ROM drive. However, fast access storage media is usually more costly than slow access storage media. In order to accommodate both cost and ease of use considerations, the storage management system can automatically relocate files within the system based upon the frequency at which each file is accessed. Files which are frequently accessed are relocated to and maintained on fast access storage media. Files which are less frequently accessed are relocated to and maintained on slower storage media.

Figure 18:
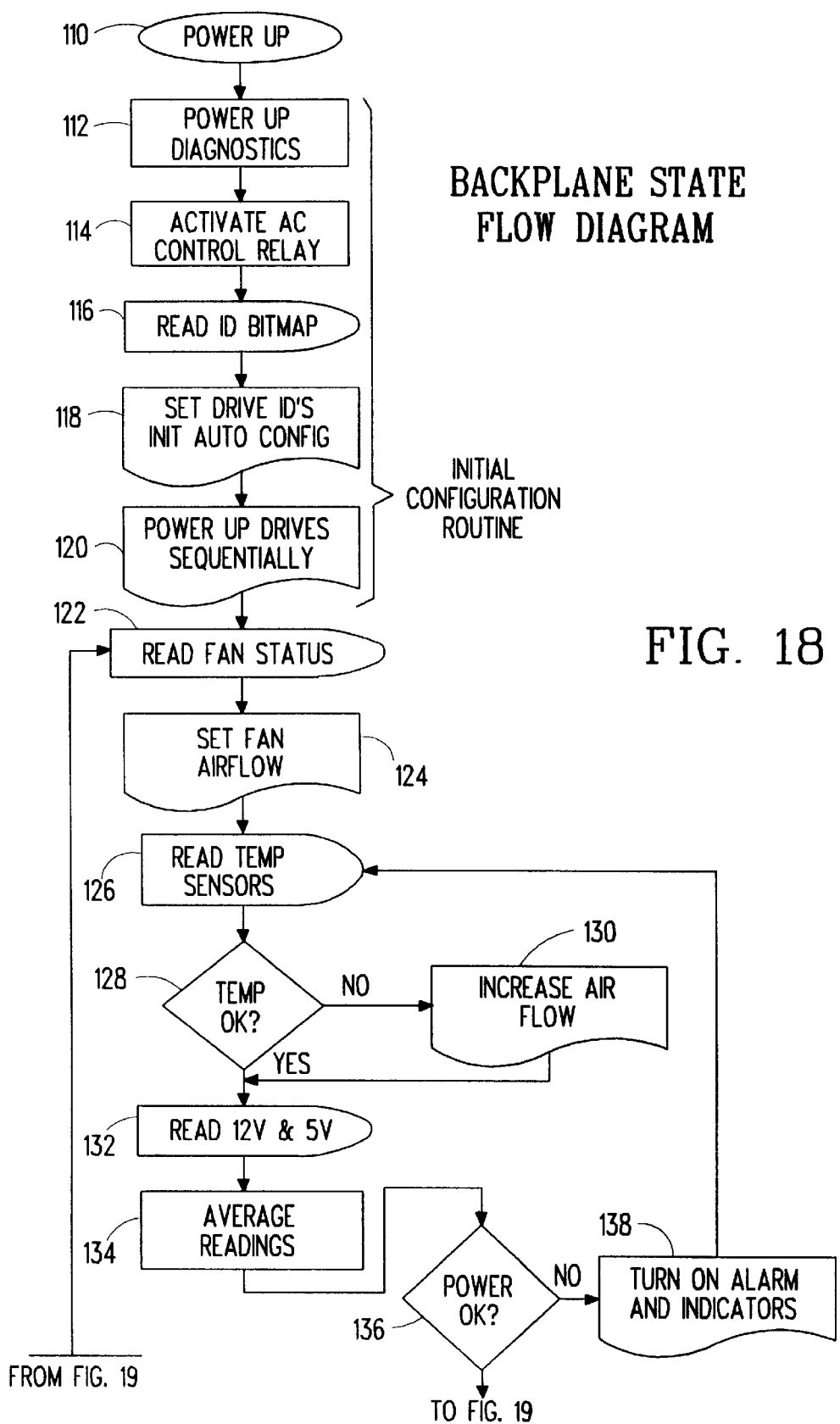
FIGS. 18 & 19 are backplane state flow diagrams.
Figure 19:
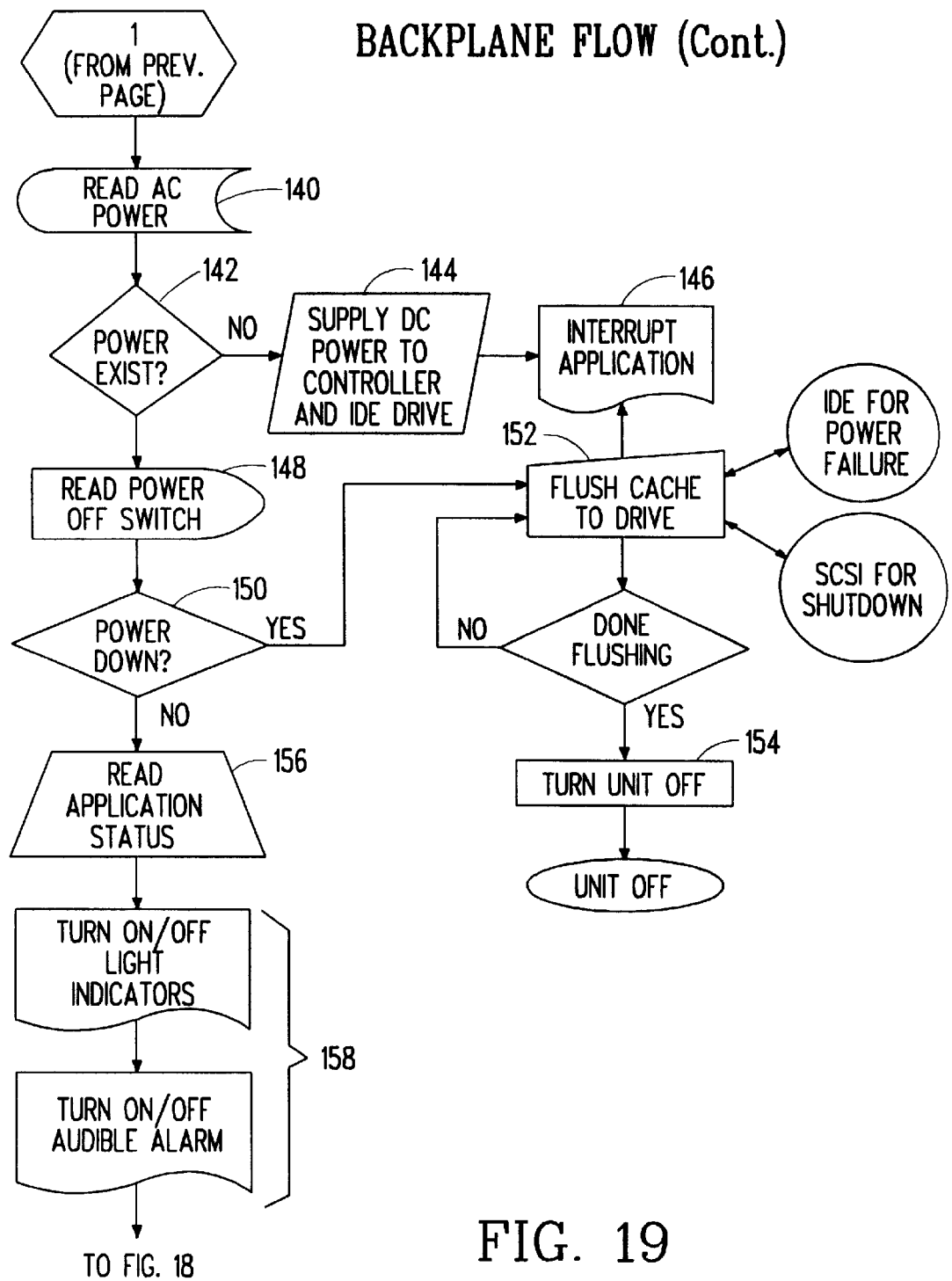

The method executed by the microprocessor controlled backplane is illustrated in FIGS. 18 & 19. In a series of initialization steps the backplane powers up 110, executes power up diagnostics 112, activates an AC control relay 114, reads the ID bitmap 116, sets the drive IDs 118, sequentially powers up the drives 120, reads the fan status 122 and then sets fan airflow 124 based upon the fan status. Temperature sensors located within the chassis are then polled 126 to determine 128 if the operating temperature is within a predetermined acceptable operating range. If not, airflow is increased 130 by resetting fan airflow. The backplane then reads 132 the 12V and 5V power supplies and averages 134 the readings to determine 136 whether power is within a predetermined operating range. If not, the alarm and indicators are activated 138. If the power reading is within the specified range, the AC power is read 140 to determine 142 whether AC power is available. If not, DC power is supplied 144 to the controller and IDE drives and an interrupt 146 is issued. If AC power exists, the state of the power off switch is determined 148 to detect 150 a power down condition. If power down is active, the cache is flushed 152 (to IDE for power failure and to SCSI for shutdown) and the unit is turned off 154. If power down is not active, application status is read 156 for any change in alarms and indicators. Light and audible alarms are employed 158 if required. Fan status is then rechecked 122. When no problem is detected this routine is executed in a loop, constantly monitoring events.

Figure 23:
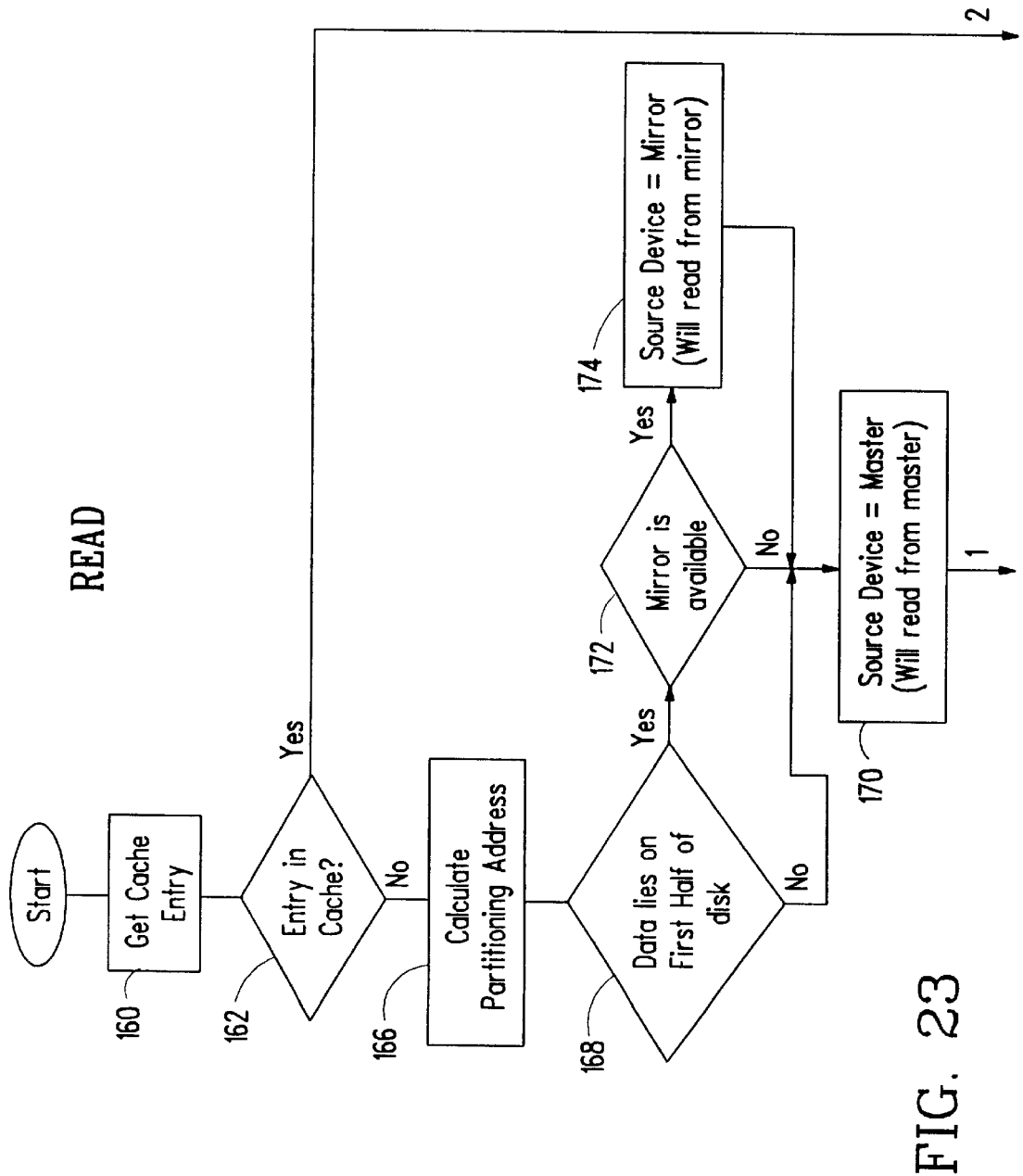
FIGS. 23–25 are flow diagrams which illustrate a READ cycle.
Figure 24:
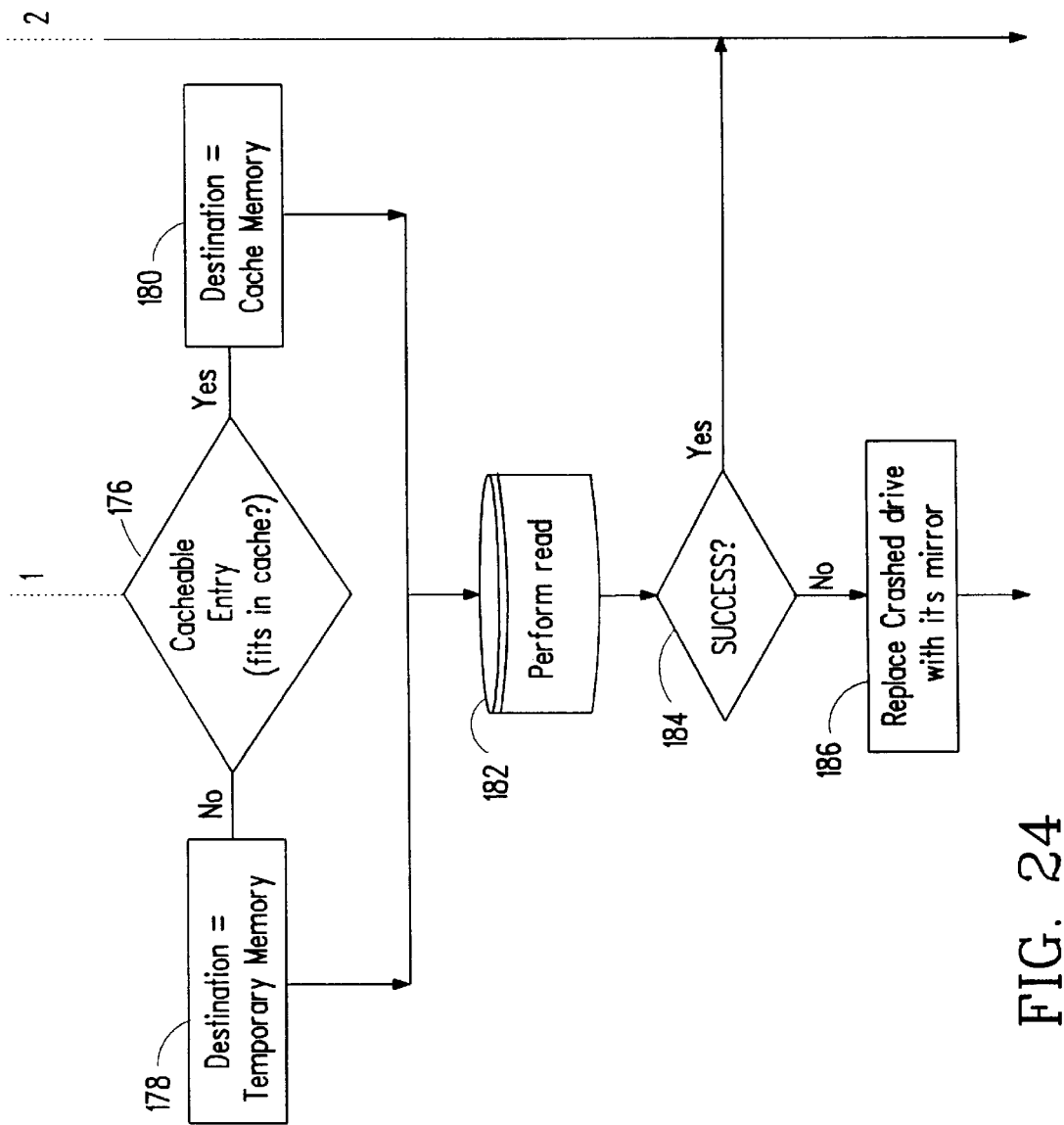
Figure 25:
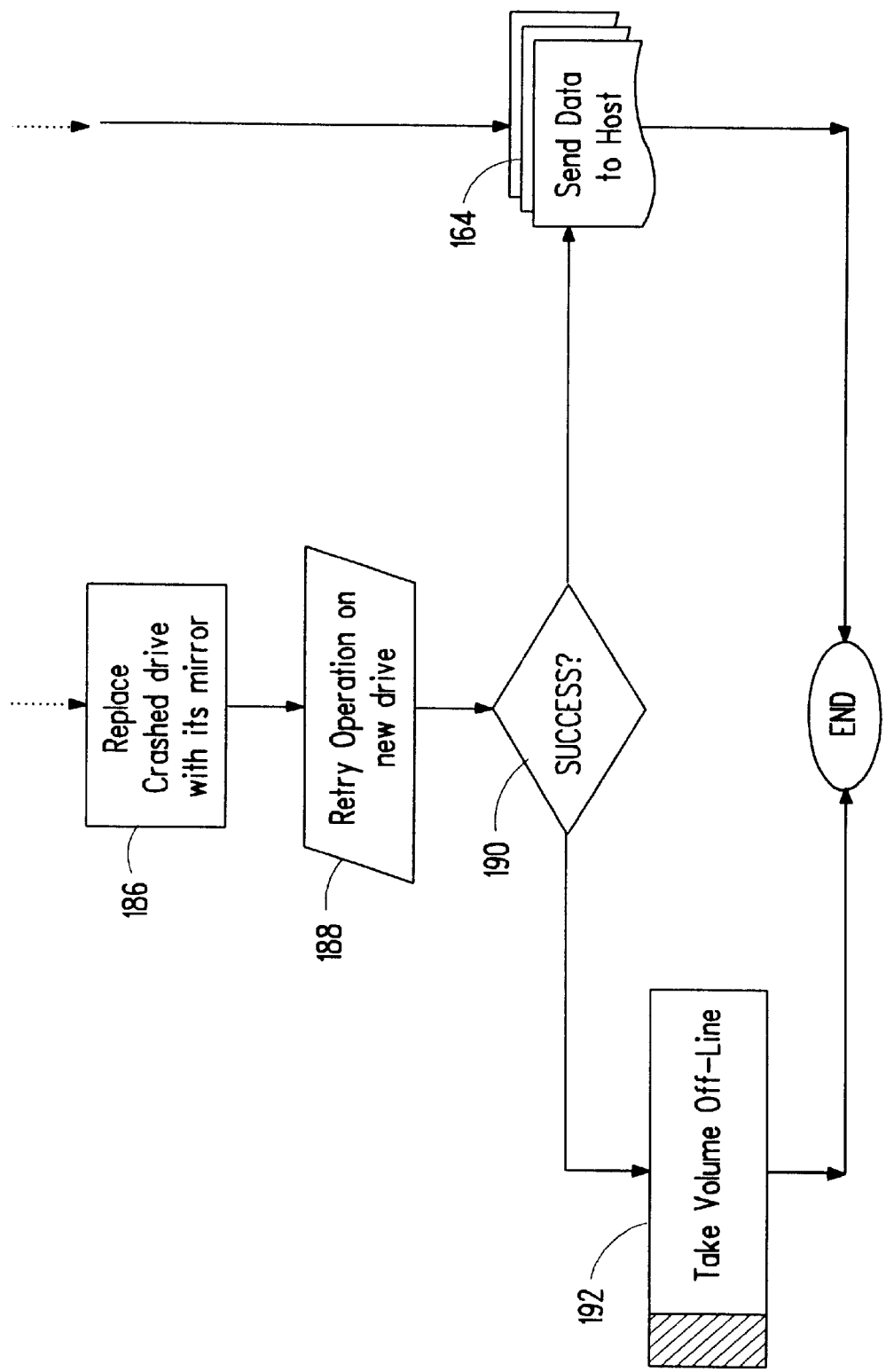
Figure 26:
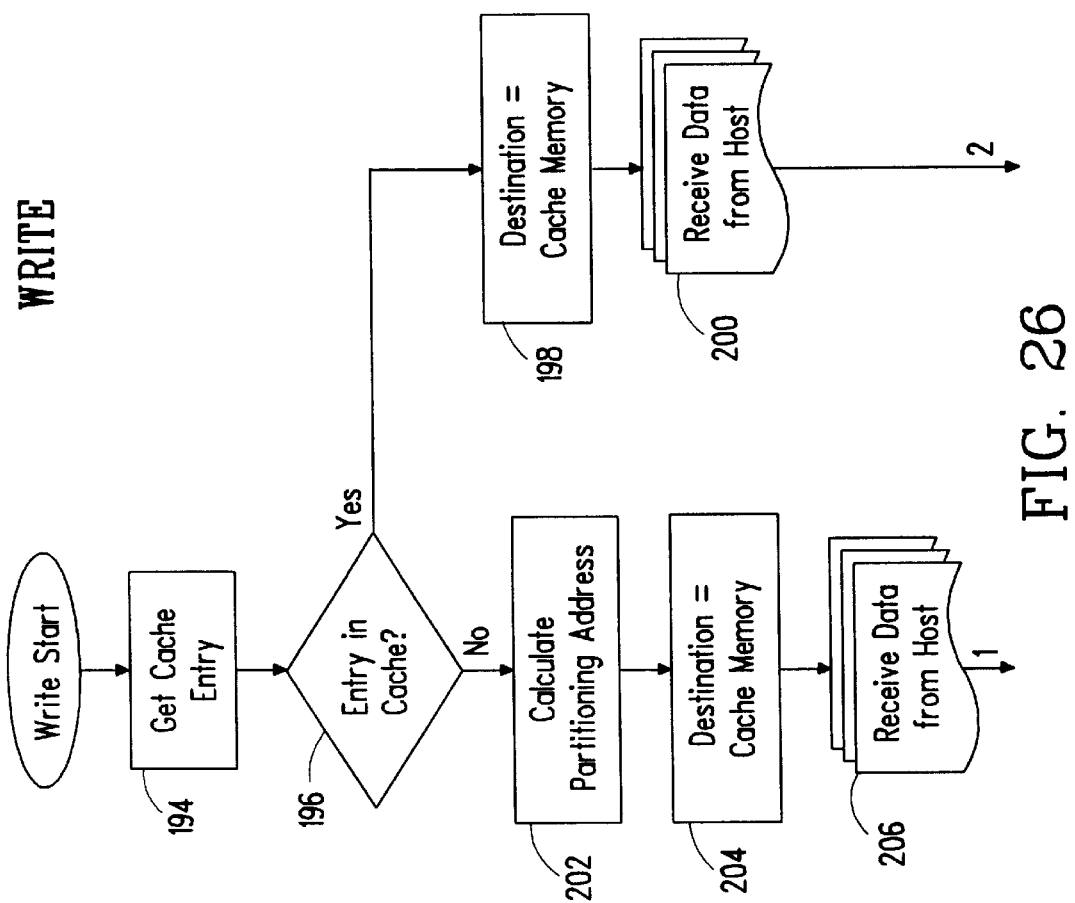
FIGS. 26–29 are flow diagrams which illustrate a WRITE cycle.
Figure 27:
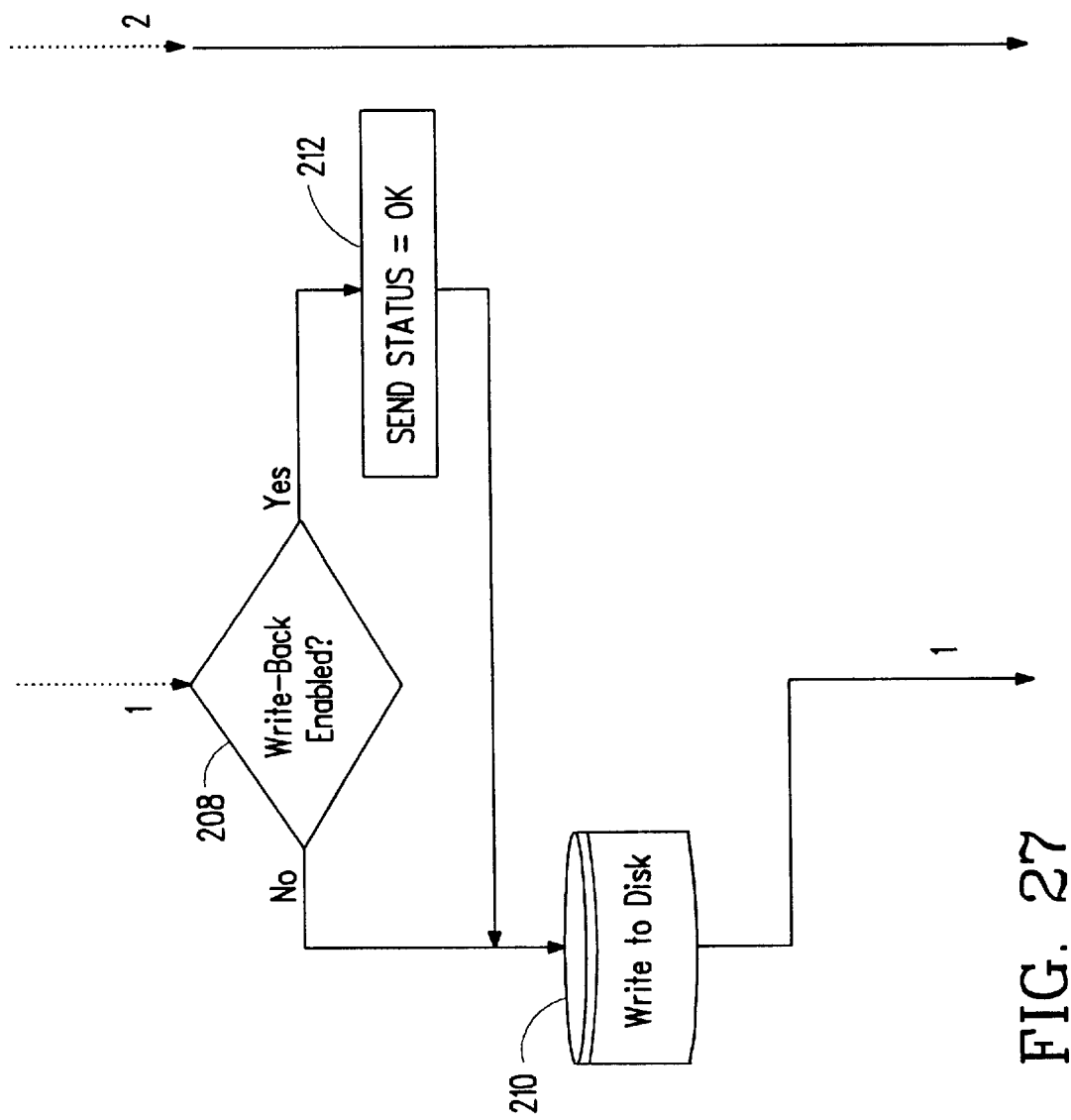
Figure 28:
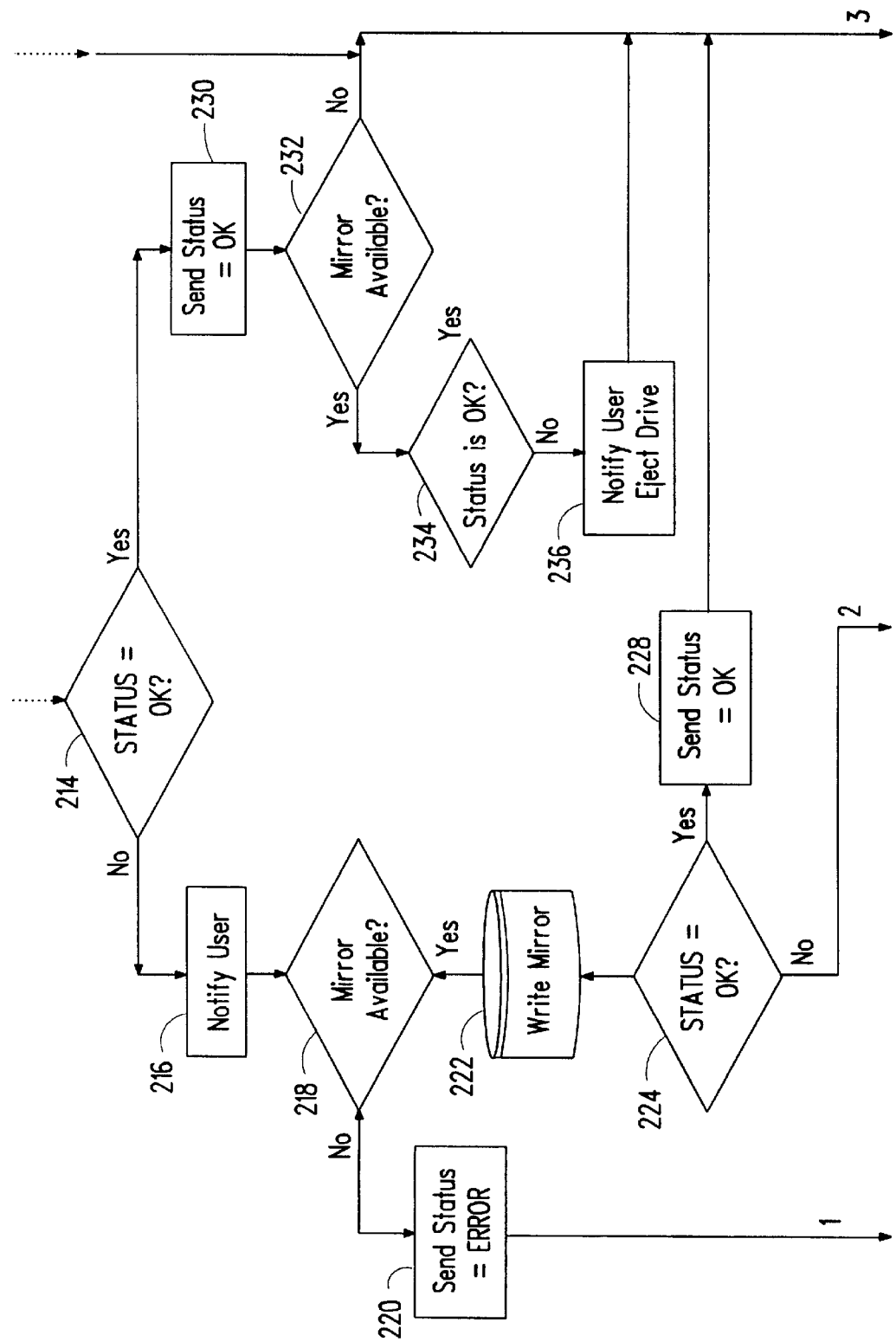
Figure 29:
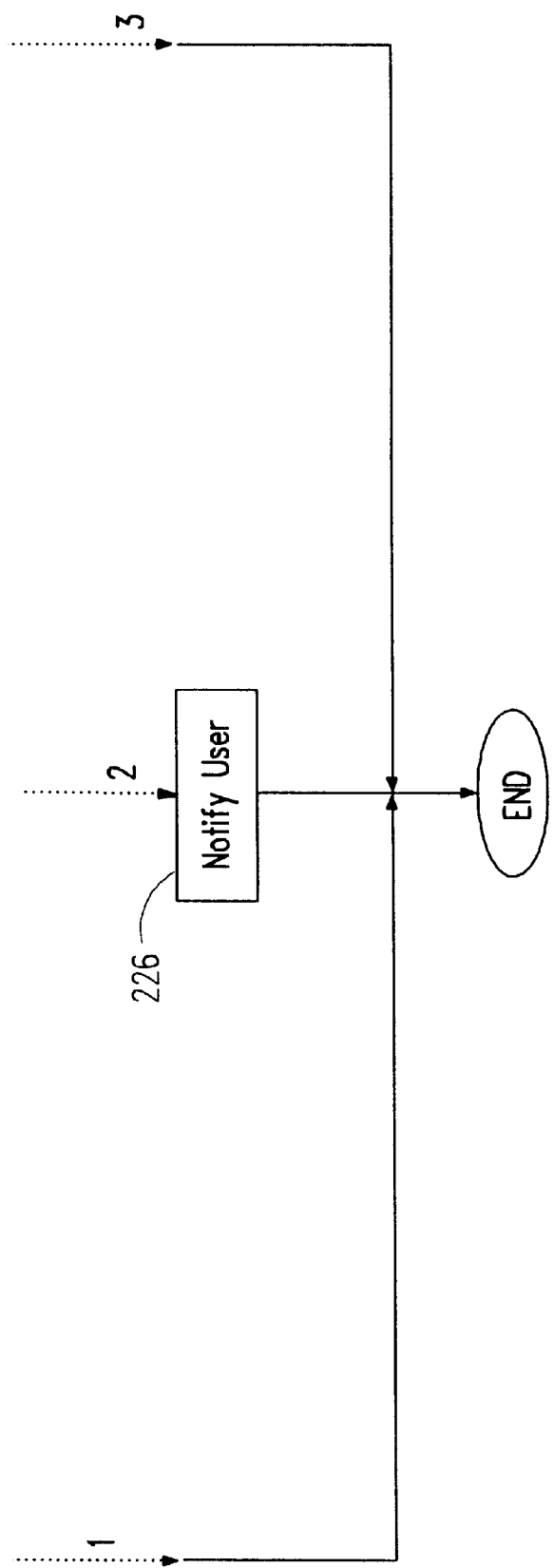

A READ cycle is illustrated in FIGS. 23–25. In a first step 160 a cache entry is retrieved. If the entry is in the cache as determined in step 162, the data is sent 164 to the host and the cycle ends. If the entry is not in the cache, a partitioning address is calculated 166 and a determination 168 is made as to whether the data lies on the first half of the disk. If not, the source device is set 170 to be the master. If the data lies on the first half of the disk, mirror availability is determined 172. If no mirror is available, the source device is set 170 to be the master. If a mirror is available, the source device is set 174 to be the mirror. In either case, it is next determined 176 whether the entry is cacheable, i.e., whether the entry fits in the cache. If not, the destination is set 178 to be temporary memory. If the entry is cacheable, the destination is set 180 to be cache memory. A read is then performed 182 and, if successful as determined in step 184, the data is sent 164 to the host. If the read is not successful, the storage device is replaced 186 with the mirror and the read operation is retried 188 on the new drive. If the read retry is successful as determined in step 190, the data is sent 164 to the host. If the read is unsuccessful, the volume is taken off-line 192.

A WRITE cycle is illustrated in FIGS. 26–29. In an initial step 194 an attempt is made to retrieve the entry from the cache. If the entry is in the cache as determined in step 196, the destination is set 198 to be the cache memory and the data is received 200 from the host. If the entry is not in the cache, a partitioning address is calculated 202, the destination is set 204 to cache memory, and the data is received 206 from the host. A determination 208 is then made as to whether write-back is enabled. If write back is not enabled, a write 210 is made to the disk. If write-back is enabled, send status is first set 212 to OK, and then a write 210 is made to the disk. A status check is then executed 214 and, if status is not OK, the user is notified 216 and a mirror availability check 218 is done. If no mirror is available, an ERROR message is produced 220. If a mirror is available, a write 222 is executed to the mirror disk and a further status check is executed 224. If the status check 224 is negative (not OK), the user is notified 226. If the status check 224 is positive, send status is set to OK 228. If status is OK in status check 214, send status is set to OK 230 and a mirror availability check is executed 232. If no mirror is available, flow ends. If a mirror is available, a mirror status check is executed 234, and the user is notified 236 if the result of the status check is negative.

Other modifications and alternative embodiments of the present invention will become apparent to those skilled in the art in light of the information provided herein. Consequently, the invention is not to be viewed as limited to the specific embodiments disclosed herein.

What is claimed is:

1. A device for providing an interface between at least one client computer and at least one storage device, the client computer having a first microprocessor for running a software application and a first operating system which produce I/O commands, the storage device containing at least one file, comprising:

a file management system operative to convert the I/O commands from the software application and said first operating system in the client computer to high level commands to a selected format, said file management system further operative to receive said high level commands and convert said high level commands to compatible I/O commands;

a second microprocessor operative to execute said high level commands received from said file management system and access the storage device to copy data in said intermediate common format from the client computer to at least one storage device wherein said second microprocessor employs a second operating system distinct from said first operating system; and a file device driver interfacing said first operating system and the file management system by functioning to receive data and commands from the client computer and redirect the received data and commands to said file management system.

2. The interface device of claim 1 wherein said file device driver resides in the client computer.

3. The interface device of claim 2 a wherein said file management system further includes a transport driver having first and second sections for facilitating transfer of data and commands between said file device driver and said file management system, said first section receiving data and commands from said file device driver and said second section relaying such data and commands to said file management system.

4. The interface device of claim 3 wherein said file management system includes a file system supervisor operative to select file-level applications for receipt of the data from the client computer and provide storage commands.

5. The interface device of claim 4 wherein said file system supervisor is further operative to select a storage device or storage of data received from the client computer.

6. The interface device of claim 4 wherein said file system supervisor is further operative to break data received from the client computer down into blocks.

7. The interface device of claim 6 wherein said file management system further includes at least one device handler operative to interface said file system supervisor with the at least one storage device by driving the at least one storage device in response to said storage commands from said file system supervisor.

8. The interface device of claim 7 wherein said file management system further includes a device handler for each at least one storage device.

9. The interface device of claim 3 further including a kernel operative to directly execute I/O commands from the software application in the client computer.

10. The interface driver of claim 9 wherein said kernel utilizes the first operating system.

11. The interface device of claim 10 wherein said SMA kernel includes a scheduler for supervising flow of data by selectively relaying blocks of data to RAID applications.

12. A device for providing an interface between at least one client computer and at least one storage device, the client computer having a first microprocessor for running a software application and a first operating system which produce high level I/O commands, the storage device containing at least one file, comprising:

a plurality of storage devices each having a different type storage media;

a second microprocessor interposed between the client computer and said plurality of storage devices to control access thereto, said second microprocessor processing said high level I/O commands to control the power supplied to individual storage devices of said plurality of storage devices.

13. The interface device of claim 12 wherein said interconnection device executes a reconfiguration routine which identifies storage device ID conflicts among said plurality of storage devices.

14. The interface device of claim 13 wherein said reconfiguration routine provides powers-up individual storage devices of said plurality of storage devices while executing.

15. The interface device of claim 14 wherein when a storage device ID conflict is detected said reconfiguration routing changes the ID of at least one of the storage devices in conflict.

16. The interface device of claim 12 wherein said interconnection device executes a media tracking routine which identifies storage device types.

17. The interface device of claim 16 wherein said media tracking routine automatically selects a storage device for WRITE operations.

18. The interface device of claim 17 wherein said media tracking routine selects said storage device based upon the block size of the data to be stored.

19. The interface device of claim 17 wherein said media tracking routine selects said storage device based upon media write speed.

20. The interface device of claim 12 including a plurality of power supplies for supplying power to said storage devices, said storage devices being grouped into racks such that at least one global power supply is available to serve as backup to a plurality of such racks of power supplies.

21. The interface device of claim 12 including a plurality of power supplies for supplying power to said storage devices, said storage devices being grouped into racks such that each rack is associated with a global power supply available to serve as backup to the rack with which the global power supply is associated.

22. The interface device of claim 12 including a plurality of power supplies, said microprocessor controlled interconnection device monitoring said power supplied to detect failed devices.

23. The interface connector of claim 22 wherein said storage devices are disposed in a protective chassis, and failed devices are automatically ejected from said chassis.

24. The interface connector of claim 12 further including a redundant array of independent disks.

25. The interface connector of claim 24 further including an XOR router having dedicated XOR hardware.

26. The interface connector of claim 25 wherein at least one surface of each disk in said redundant array of independent disks is dedicated to parity operations.

27. The interface connector of claim 25 wherein at least one disk in said redundant array of independent disks is dedicated to parity operations.

28. The interface connector of claim 25 wherein said disks of said redundant array of independent disks are arranged on a plurality of separate channels.

29. The interface connector of claim 28 wherein each said channel includes a dedicated memory pool.

30. The interface connector of claim 29 wherein said channels are interconnected by first and second thirty-two bit wide busses.

31. The interface connector of claim 24 further including a graphic user interface for displaying storage system status and receiving commands from a user.

32. The interface connector of claim 24 including hardware for data splitting and parity generation "on the fly" with no performance degradation.

* * * * *